(12) United States Patent
Kumar et al.

(10) Patent No.: US 12,683,978 B2
(45) Date of Patent: Jul. 14, 2026

(54) CLIQUE GRAPH MINING FOR HOST NAVIGATION SAFETY

(71) Applicant: MICROSOFT TECHNOLOGY LICENSING, LLC, Redmond, WA (US)

(72) Inventors: Avinash Kumar, Hyderabad (IN); Shanu Kumar, Hyderabad (IN); Sai Krishna Mendu, Hyderabad (IN); Mayana Wanderley Pereira, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 18/419,227

(22) Filed: Jan. 22, 2024

(65) Prior Publication Data

US 2025/0240304 A1      Jul. 24, 2025

(51) Int. Cl.
*H04L 9/40* (2022.01)
*G06F 16/953* (2019.01)

(52) U.S. Cl.
CPC .......... *H04L 63/126* (2013.01); *G06F 16/953* (2019.01)

(58) Field of Classification Search
None
See application file for complete search history.

(56) References Cited

U.S. PATENT DOCUMENTS

| | | | | |
|---|---|---|---|---|
| 8,600,921 | B2 * | 12/2013 | Burkard | ............. G06F 3/04847 706/45 |
| 11,556,841 | B2 * | 1/2023 | Duan | ...................... G06F 18/23 |
| 2016/0188182 | A1 * | 6/2016 | Burkard | ................ G06N 5/048 715/760 |
| 2018/0121417 | A1 * | 5/2018 | Misra | .................. G06F 11/0766 |
| 2021/0004459 | A1 * | 1/2021 | Mishra | ................. G06F 21/554 |
| 2021/0075809 | A1 * | 3/2021 | Cherkasov | .......... H04L 63/1425 |
| 2021/0224662 | A1 * | 7/2021 | Evnine | ................... G06N 5/022 |

FOREIGN PATENT DOCUMENTS

CN            101521657 A  *  9/2009

* cited by examiner

*Primary Examiner* — Jeffrey R Swearingen
(74) *Attorney, Agent, or Firm* — Shook, Hardy & Bacon L.L.P.

(57) ABSTRACT

Various embodiments of the technology described herein programmatically expand the capabilities of computing systems to allow for the determination of a host authority value indicative of a reliability of a particular host identified as a node in a Host Navigation Graph (HNG). A classifier or other neural network model is trained, based on the HNG, to classify or determine a reliability the particular host based on the host authority value. Based on the host authority value, the particular host is classified and a mitigation is taken to reduce the negative effects associated with a user interacting with a low-authority host. An example mitigation action includes generating a graphical user interface (GUI) element to notify a user of the reliability of a particular host, for example, before, during, or after a user interacts with the host.

20 Claims, 12 Drawing Sheets

*FIG. 4A*

◁ Unleash Your Creativity ✕ | + www.totallylegitphotosoftware.com

432

Unleash Your Creativity:
The Ultimate Guide to Top Photo Editing Software

Welcome to our comprehensive guide on the best photo editing software, curated to elevate your visual storytelling and unleash your creativity. Whether you're a professional photographer or an amateur enthusiast, the right photo editing tool can make all the difference. In this article, we'll explore industry-leading photo editing software, highlighting their features, versatility, and ease of use. Below, you'll find direct links to download these powerful tools and embark on a journey of transforming your images into masterpieces.

1. Adobe Photoshop CC:
Adobe Photoshop CC stands as the undisputed champion in the world of photo editing. Known for its unparalleled features, including advanced retouching, intricate layer management, and a vast array of filters, Photoshop is the go-to choice for professionals. Whether you're editing portraits, landscapes, or creating digital art, Photoshop provides the tools to bring your vision to life.
Download Photoshop CC

2. Lightroom Classic:
Adobe Lightroom Classic is a powerhouse for photographers who want efficient photo organization and editing. With a user-friendly interface and powerful editing tools, Lightroom Classic is ideal for enhancing RAW images, managing large photo libraries, and achieving consistent tones across your projects. Elevate your photography with Lightroom Classic's intuitive workflow.
Download Lightroom Classic

3. GIMP (GNU Image Manipulation Program):
GIMP is a free, open-source photo editing software that rivals many many paid alternatives. Packed with advanced features, GIMP provides a flexible and customizable environment for image manipulation. It supports various file formats, offers powerful selection tools, and is constantly evolving through its active community. If you're looking for a robust, free option, GIMP is a solid choice.
Download GIMP

4. Capture One:
Capture One is a professional-grade editing tool favored by photographers for its exceptional color grading capabilities and tethered shooting options. With a focus on preserving image quality and providing precise

FIG. 4C

430

440

× a Unleash Your Creativity          × | +

← C ⌂ | (×) www.totallylegitphotosoftware.com

Unleash Your Creativity:
The Ultimate Guide to Top Photo Editing Software

Welcome to our comprehensive guide on the best photo editing software, curated to elevate your visual storytelling and unleash your creativity. Whether you're a professional photographer or an amateur enthusiast, the right photo editing tool can make all the difference. In this article, we'll explore industry-leading photo editing software, highlighting their features, versatility, and ease of use. Below, you'll find direct links to download these powerful tools and embark on a journey of transforming your images into masterpieces.

1. Adobe Photoshop CC:
Adobe Photoshop CC stands as the undisputed champion in the world of photo editing. Known for its unparalleled features, including advanced retouching, intricate layer management, and a vast array of filters, Photoshop is the go-to choice for professionals. Whether you're editing portraits, landscapes, or creating digital art, Photoshop provides the tools to bring your vision to life.
Download Photoshop CC

2. Lightroom Class
Adobe Lightroom Class
editing. With a user-frien
RAW images, managing
Elevate your photograp
Download Lightroom C

ganization and
l for enhancing
projects.

Proceed with Caution: This
website has been determined
to have low authority.

⌐ 442

3. GIMP (GNU Image Manipulation Program):
GIMP is a free, open-source photo editing software that rivals many paid alternatives. Packed with advanced features, GIMP provides a flexible and customizable environment for image manipulation. It supports various file formats, offers powerful selection tools, and is constantly evolving through its active community. If you're looking for a robust, free option, GIMP is a solid choice.
Download GIMP

4. Capture One:
Capture One is a professional-grade editing tool favored by photographers for its exceptional color grading capabilities and tethered shooting options. With a focus on preserving image quality and providing precise

FIG. 4D

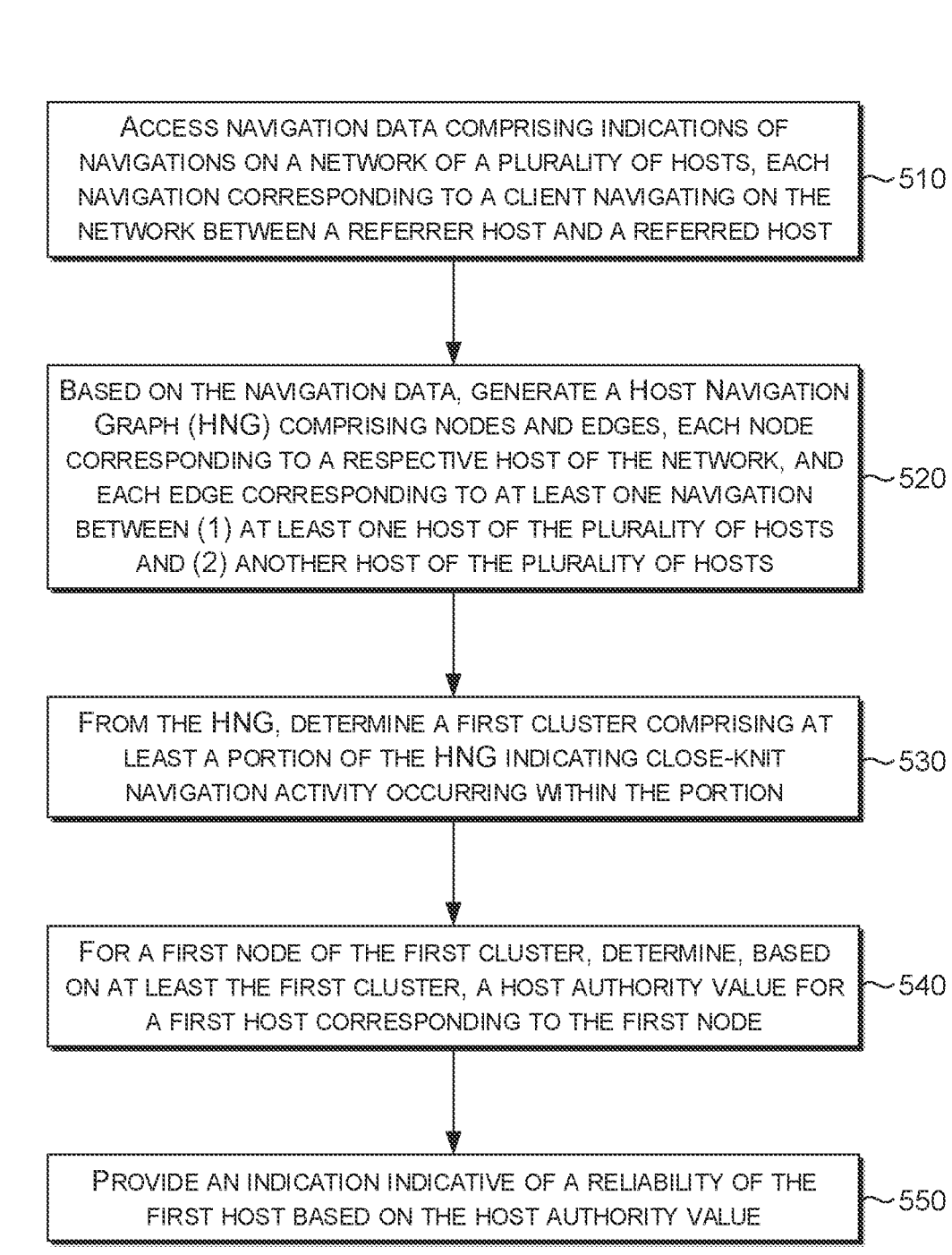

500

ACCESS NAVIGATION DATA COMPRISING INDICATIONS OF NAVIGATIONS ON A NETWORK OF A PLURALITY OF HOSTS, EACH NAVIGATION CORRESPONDING TO A CLIENT NAVIGATING ON THE NETWORK BETWEEN A REFERRER HOST AND A REFERRED HOST ～510

BASED ON THE NAVIGATION DATA, GENERATE A HOST NAVIGATION GRAPH (HNG) COMPRISING NODES AND EDGES, EACH NODE CORRESPONDING TO A RESPECTIVE HOST OF THE NETWORK, AND EACH EDGE CORRESPONDING TO AT LEAST ONE NAVIGATION BETWEEN (1) AT LEAST ONE HOST OF THE PLURALITY OF HOSTS AND (2) ANOTHER HOST OF THE PLURALITY OF HOSTS ～520

FROM THE HNG, DETERMINE A FIRST CLUSTER COMPRISING AT LEAST A PORTION OF THE HNG INDICATING CLOSE-KNIT NAVIGATION ACTIVITY OCCURRING WITHIN THE PORTION ～530

FOR A FIRST NODE OF THE FIRST CLUSTER, DETERMINE, BASED ON AT LEAST THE FIRST CLUSTER, A HOST AUTHORITY VALUE FOR A FIRST HOST CORRESPONDING TO THE FIRST NODE ～540

PROVIDE AN INDICATION INDICATIVE OF A RELIABILITY OF THE FIRST HOST BASED ON THE HOST AUTHORITY VALUE ～550

CAPTURE, VIA A WEB BROWSER, NAVIGATION DATA COMPRISING INDICATIONS OF NAVIGATIONS ON A NETWORK OF A PLURALITY OF HOSTS, EACH NAVIGATION CORRESPONDING TO A CLIENT NAVIGATING BETWEEN AT LEAST TWO HOSTS OF THE PLURALITY OF HOSTS — 610

TRANSMIT THE NAVIGATION DATA TO A SERVER SYSTEM CONFIGURED TO ACCESS A PLURALITY OF NAVIGATION DATA FROM A PLURALITY OF USERS TO GENERATE A HOST NAVIGATION GRAPH (HNG) COMPRISING NODES AND EDGES, EACH NODE CORRESPONDING TO A RESPECTIVE HOST OF THE NETWORK, AND EACH EDGE CORRESPONDING TO A NAVIGATION FROM AT LEAST ONE HOST OF THE PLURALITY OF HOSTS TO ANOTHER HOST OF THE PLURALITY OF HOSTS — 620

RECEIVE, FROM THE SERVER SYSTEM, A HOST AUTHORITY VALUE FOR A FIRST HOST OF THE PLURALITY OF HOSTS, THE FIRST HOST CORRESPONDING TO A FIRST NODE OF THE HNG, WHEREIN THE HOST AUTHORITY VALUE IS DETERMINED FOR THE FIRST HOST BASED ON A FIRST CLUSTER COMPRISING AT LEAST A PORTION OF THE HNG INDICATING CLOSE-KNIT NAVIGATION ACTIVITY OCCURRING WITHIN THE PORTION — 630

CAUSE PRESENTATION OF A GRAPHICAL USER INTERFACE (GUI) ELEMENT INDICATIVE OF THE HOST AUTHORITY VALUE FOR THE FIRST HOST — 640

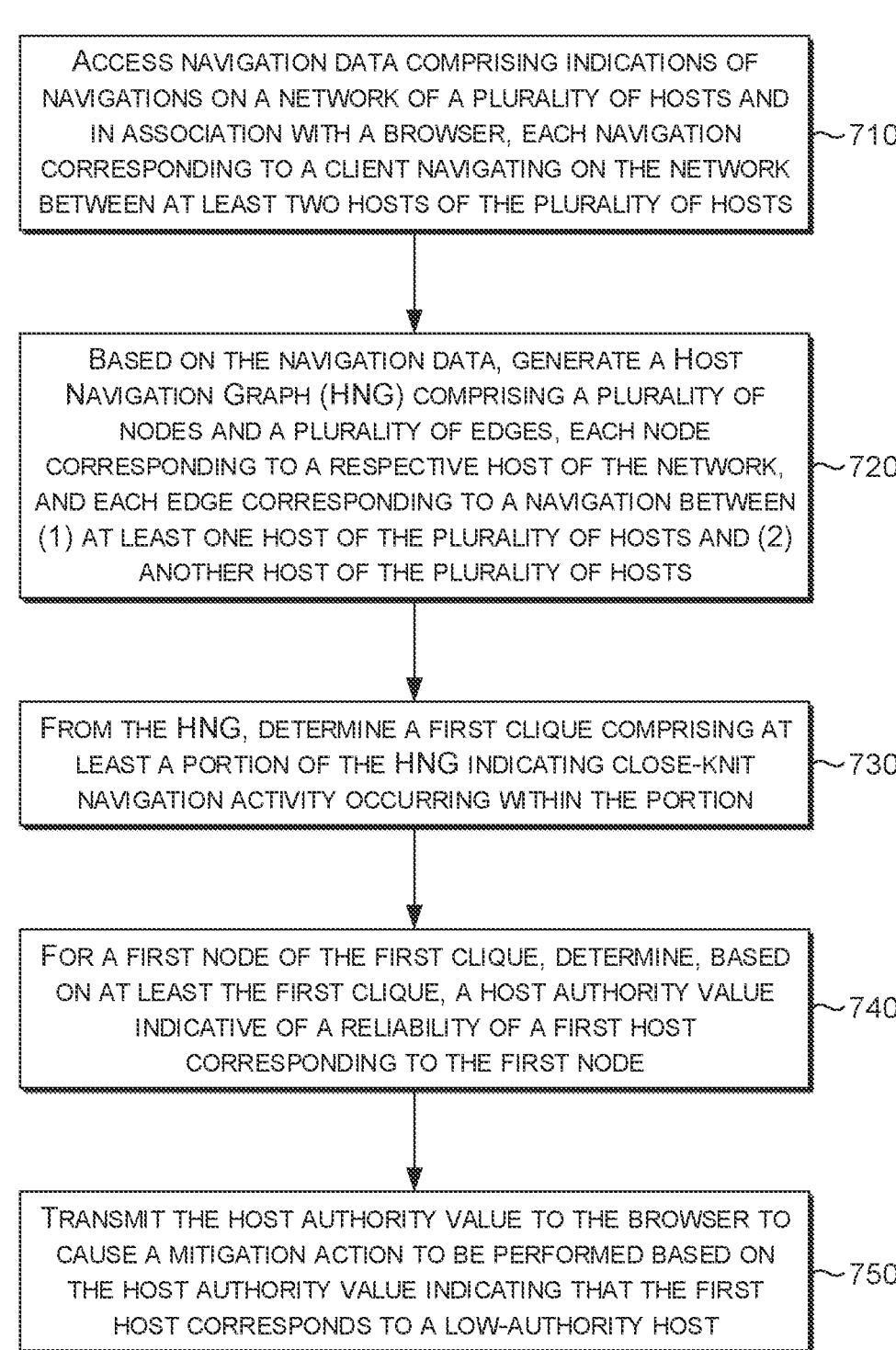

ACCESS NAVIGATION DATA COMPRISING INDICATIONS OF NAVIGATIONS ON A NETWORK OF A PLURALITY OF HOSTS AND IN ASSOCIATION WITH A BROWSER, EACH NAVIGATION CORRESPONDING TO A CLIENT NAVIGATING ON THE NETWORK BETWEEN AT LEAST TWO HOSTS OF THE PLURALITY OF HOSTS     ~710

BASED ON THE NAVIGATION DATA, GENERATE A HOST NAVIGATION GRAPH (HNG) COMPRISING A PLURALITY OF NODES AND A PLURALITY OF EDGES, EACH NODE CORRESPONDING TO A RESPECTIVE HOST OF THE NETWORK, AND EACH EDGE CORRESPONDING TO A NAVIGATION BETWEEN (1) AT LEAST ONE HOST OF THE PLURALITY OF HOSTS AND (2) ANOTHER HOST OF THE PLURALITY OF HOSTS     ~720

FROM THE HNG, DETERMINE A FIRST CLIQUE COMPRISING AT LEAST A PORTION OF THE HNG INDICATING CLOSE-KNIT NAVIGATION ACTIVITY OCCURRING WITHIN THE PORTION     ~730

FOR A FIRST NODE OF THE FIRST CLIQUE, DETERMINE, BASED ON AT LEAST THE FIRST CLIQUE, A HOST AUTHORITY VALUE INDICATIVE OF A RELIABILITY OF A FIRST HOST CORRESPONDING TO THE FIRST NODE     ~740

TRANSMIT THE HOST AUTHORITY VALUE TO THE BROWSER TO CAUSE A MITIGATION ACTION TO BE PERFORMED BASED ON THE HOST AUTHORITY VALUE INDICATING THAT THE FIRST HOST CORRESPONDS TO A LOW-AUTHORITY HOST     ~750

CLIENT DEVICE
980

FABRIC
CONTROLLER
940

HOST
950

VIRTUAL
MACHINE
952

VIRTUAL
MACHINE
954

NODE 930

RESOURCES
960

RACK 920

CLOUD COMPUTING PLATFORM 910

CLIQUE GRAPH MINING FOR HOST NAVIGATION SAFETY

BACKGROUND

A web browser, a browser, or a user agent is an application for accessing websites, web content, or web files. When a user requests a web page from a particular website, the web browser typically retrieves files from a web server and then generates the web page on the web browser. For example, a user input, such as entering a Uniform Resource Locator (URL) or clicking on a URL link, causes a web browser to check the Domain Name System (DNS) to access the server's Internet Protocol (IP) address associated with the entered domain. Thereafter, the web browser sends to the web server a HyperText Transfer Protocol (HTTP) request or a HyperText Transfer Protocol Secure (HTTPS) request, specifying the desired resource, such as the particular web page. The web server processes the HTTP or HTTPS request, retrieves the requested data (usually HyperText Markup Language [HTML], Cascading Style Sheets [CSS], or JavaScript files), and sends the requested data back to the browser for rendering.

Often, a user may not know to which URL to navigate to best service their request. As a result, a user may leverage a search engine instead of inputting a URL directly into the web browser. In one example, a search engine is a website that employs any number of search algorithms to provide links to other websites in response to a query. Example search engines include those associated with BING®, GOOGLE®, and YAHOO!®, among others. The increasing volume and diversity of online content poses certain challenges, such as the potential for surfacing misinformation or inaccurate sources, the improvement of which is difficult to achieve and implement in practice.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein programmatically expand the capabilities of computing systems to allow for a graphical user interface (GUI) element to be generated based on the determination of a host authority value indicative of a reliability of a particular host identified as a node in a Host Navigation Graph (HNG). Based on the host authority value, the particular host is classified, for example, as a low-authority host, and a mitigation is taken to reduce the negative effects associated with a user interacting with the low-authority host. An example mitigation action includes generating a GUI element to notify a user of the reliability of a particular host, for example, before, during, or after a user interacts with the host. One example GUI element includes an indication that a host associated with a Uniform Resource Locator (URL) surfaced on a search engine corresponds to a low-authority host, so as to deter user interaction with the low-authority host.

Certain existing techniques trying to determine parameters for different hosts struggle to accurately and in a computationally efficient manner determine the authority of hosts, especially low-authority hosts. At most, certain existing techniques focus on high-cardinality hosts while ignoring the lesser known, low-cardinality hosts and their corresponding parameters or features.

To improve upon certain existing approaches, certain embodiments of this disclosure provide a more comprehensive, yet computationally efficient approach that does not ignore low-cardinality hosts, and instead leverages an HNG having information of higher and/or lower cardinality hosts to better determine a host authority value indicative of a level of reliability for a host. In one example, the HNG is generated based on navigation data that is crowd sourced across one or more users and their respective navigations between hosts. For example, the HNG includes nodes corresponding to respective hosts of the network, and includes edges corresponding to a respective navigation between two or more hosts. In one embodiment, a clique is determined from the HNG, such that the clique corresponds to close-knit navigation activity indicative of a pattern of navigations between hosts within a portion of the HNG. One example of a cluster includes a clique, and in at least one example discussed herein, the terms "cluster" and "cliques" are broadly utilized to refer to each other. In the context of graph theory, in an example, a "clique" refers to a portion of the graph (for example, the HNG), where the portion corresponds to a subset of vertices formed by one or more edges joining at a node. In one embodiment, a clique includes a subset of vertices in an HNG, such that every pair of distinct vertices in the subset of vertices is connected by an edge.

One or more features are determined from a host in the clique or for the clique, for example, using any suitable clustering-related algorithm, such as the Bron-Kerbosch Clique Graph Mining algorithm. Based on the one or more features, a host authority value indicative of a reliability of the first host is determined. Based on the host authority value for the host, a mitigation action is taken or recommended before, during, or after a user interaction with a component of the host, such as during a user hovering over a hyperlink corresponding to the host. One example mitigation action includes generating a pop-up window indicating that the host of the third search result is associated with a low-authority host.

The present disclosure provides one or more technical solutions that have technical effects in light of various technical problems. For example, particular embodiments have the technical effect of bridging knowledge gaps in the understanding between high-cardinality hosts and low-cardinality hosts. Either the high-cardinality hosts or low-cardinality hosts are generally ignored by certain existing approaches, resulting in an incomplete understanding of an ever-growing number of hosts making information accessible via the web. For example, the disclosed multilayered analysis performs graph mining and neural network building and training to determine a host authority value indicative of a reliability of the host. Thereafter a mitigation action, such as generating a warning, other GUI elements, or indication of a low-authority host to proactively deter interaction with these low-priority hosts, is performed. Additionally, particular embodiments have the technical effect of improved generation of HNGs. This is because various embodiments implement the technical solutions of accessing navigation data including navigations between hosts to determine a pattern of nodes connected by edges, among other features associated with a related clique. Additionally, particular embodiments have the technical effect of reducing oversight and bias in determining an authenticity of a host, thereby improving the accuracy and appropriateness of a mitigation action.

BRIEF DESCRIPTION OF THE DRAWINGS

The present disclosure is described in detail below with reference to the attached drawing figures, wherein:

FIG. 4A is a screenshot of a first example interface that includes a browser containing search results ordered based on corresponding authority scores, in accordance with an embodiment of the present disclosure;

FIG. 4C is a screenshot of a third example interface that includes a browser having an icon indicating that a corresponding website has a low-authority level, in accordance with an embodiment of the present disclosure;

FIG. 4D is a screenshot of a fourth example interface that includes a pop-up window overlaid on a browser, in accordance with an embodiment of the present disclosure;

FIG. 5 depicts a flow diagram of a method for providing an indication of a reliability of a host corresponding to a node in a Host Navigation Graph (HNG), in accordance with an embodiment of the present disclosure;

FIG. 6 depicts a flow diagram of a method for causing presentation of a graphical user interface (GUI) element indicative of a host authority value for a host and determined based on a cluster of an HNG, in accordance with an embodiment of the present disclosure;

FIG. 7 depicts a flow diagram of a method for transmitting a host authority value to the browser to cause the browser to perform a mitigation action based on the host authority value indicating that the first host corresponds to a low-authority host, in accordance with an embodiment of the present disclosure;

DETAILED DESCRIPTION

Figure 1:
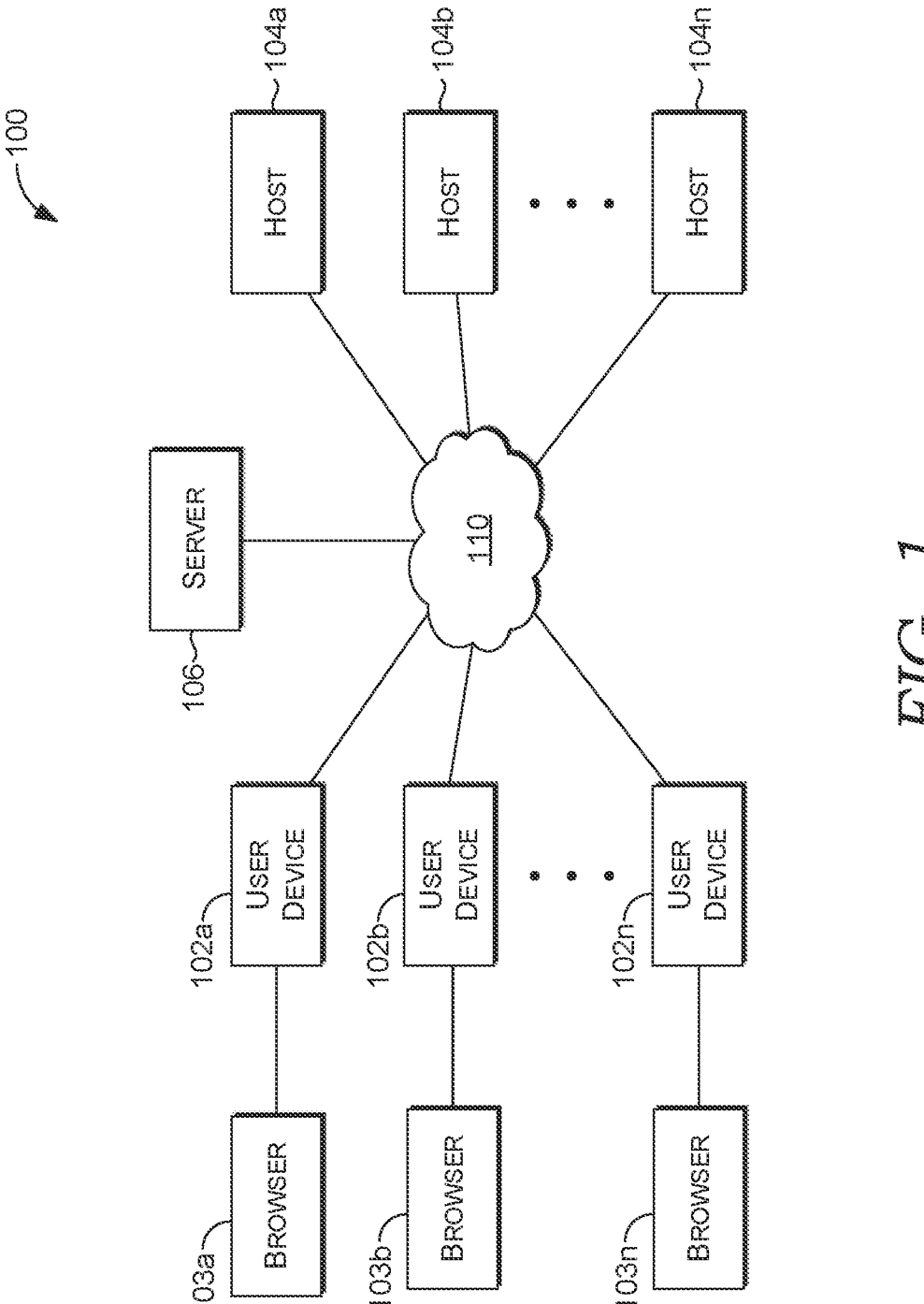
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, this disclosure contemplates that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Various embodiments discussed herein programmatically expand the capabilities of computing systems to allow for a graphical user interface (GUI) element to be generated or other mitigation action to be electronically generated based on the determination of a host authority value indicative of a reliability of a particular host identified as a node in a Host Navigation Graph (HNG). Based on the host authority value, the particular host is classified and a mitigation action is performed to reduce the negative effects associated with a user interacting with a low-authority host. An example mitigation action includes generating a graphical user interface (GUI) element to notify a user of the reliability of a particular host, for example, before, during, or after a user interacts with the host. One example GUI element includes an indication that a host associated with a Uniform Resource Locator (URL) surfaced on a search engine corresponds to a low-authority host, so as to deter user interaction with the low-authority host.

In one example, the "host authority value" or the "host authority score" corresponds to a value that provides an indication of a level of reliability for the corresponding score. The host authority value can be used to classify a corresponding host. In one example, the host authority value is binary such that it indicates whether a corresponding host corresponds to a low-authority host or a higher authority host, which can be indicated via a key-value pair or any other data structure that is associated with the corresponding host. In one example, the host authority value corresponds to a value that is compared against one or more thresholds, such that a host authority value that is below (or above) a threshold is classified as a "low-authority host," and a host authority value that is above (or below) a threshold is classified as a "higher (or neutral) authority host," or any other suitable classification. In one example, the thresholds are dynamic and trained to be updated based on the neural network described herein.

In one example, a "host" refers to a computer or other device connected to a computer network and capable of hosting or accessing any suitable content. In one embodiment, a host is a node that participates in user applications, either as a server, client, or both. An example host operates as a server offering information resources, such as websites, documents, and other online destinations for navigation; services, such as e-commerce, e-mail, chat, blogging, and streaming; and applications, such as productivity applications, web-based applications, browsers, and the like, to other users or other hosts on the network. In this example, the host operating as a server accepts connections from users or workflows requesting a service function. The host may be identified via at least one assigned network address, such as an IP address.

In response to performing a search, a search engine may surface, in any suitable ranking or order, any number of search results, including URLs corresponding to any number of hosts. In some embodiments, hosts differ in their levels of authenticity, reliability, or safety. For example, as the quantity of information hosted on the internet continues to increase, classifying content to ensure a safer web experience becomes a difficult and computationally expensive endeavor. In one example, "low-authority host" refers to a host, such as a website or domain, with limited credibility, reliability, or trustworthiness. Certain low-authority hosts lack reliable information, have a history of misinformation, or exhibit suspicious or unsafe behavior. In some instances, reliance on low-authority hosts causes the distribution of disinformation, compromised safety, institutional mistrust, among other undesirable outcomes, for example, when conducting research or seeking accurate information online. Accordingly, identifying low-authority hosts and subsequently taking a mitigation action can reduce distribution of misinformation and otherwise improve operation of a computing system. Example mitigation actions include, among other examples, generating a graphical user interface (GUI) element identifying the low-authority host or an aspect of the low-authority host, restricting access to the low-authority host, and ordering web search results so that hosts having a higher authority are surfaced or ordered ahead of low-authority hosts.

Certain existing techniques trying to determine parameters for different hosts struggle to accurately and in a computationally efficient manner determine the authority of hosts, especially low-authority hosts. At most, certain existing techniques focus on high-cardinality hosts while ignoring the lesser known, low-cardinality hosts and their corresponding parameters or features. In one example, "cardinality" refers to a metric quantifying the number of hosts communicating with a particular host or its particular IP address in a period of time. For example, a high-cardinality host refers to a host that receives or sends more than a threshold number of communications with other hosts, while a low-cardinality host refers to a host that receives or sends less than the threshold number of communications with other hosts. Example popular hosts, such as BING.COM, are high-cardinality hosts because they experience higher traffic than, for example, other smaller and less-visited hosts, such as less-frequently visited URLs. Ignoring low-cardinality hosts and focusing only on high-cardinality hosts may cause higher authority hosts to be surfaced during a search, but such techniques provide an incomplete analysis of hosts because low-cardinality hosts are ignored, leading to no recourse for identifying low-authority hosts and mitigating their effects.

Further compounding these issues, a certain user may not know which URL to employ to best service their request. As a result, a user may instead leverage a search engine instead of inputting a URL directly into the web browser. In one example, a "search engine" refers to a website that employs any number of search algorithms to provide links to other websites in response to a query. Example search engines include those associated with BING®, GOOGLE®, and YAHOO!®, among others. The increasing volume and diversity of online content poses certain challenges, such as the potential for surfacing misinformation or inaccurate sources by certain search engines, the improvement of which is difficult to achieve and implement in practice. Indeed, certain existing techniques lack robust solutions to enhance accuracy, to prevent the surfacing of misinformation from low-authority hosts, and to achieve personalization, while continuing to adapt to evolving user preferences.

With this in mind, certain embodiments of this disclosure provide a more comprehensive, yet computationally efficient approach that does not ignore low-cardinality hosts, and instead leverages an HNG having information of higher and/or lower cardinality hosts to better determine a host authority value indicative of a level of reliability for a host. In one example, an "HNG" refers to a digital representation containing information associated with hosts and respective navigations there between. For example, an HNG includes nodes and edges, where the "node" of the HNG corresponds to a respective host of the network, and the "edge" of the HNG corresponds to at least one navigation between two or more hosts. In one embodiment, the HNG is generated based on navigation data that is crowdsourced across a plurality of users and their navigations between hosts. Embodiments of generating the HNG including tracing a navigation from the referrer host of the URL to the visited host. In one example, a "navigation" refers to a transition from one host, such as a referrer host, to another host, such as a referred host. In one example, a navigation includes toggling between aspects of one host. In one example, each navigation creates an edge on the HNG. Over time, these edges, especially when accumulated for a plurality of users, form a digital representation reflecting navigation patterns.

Figure 3:
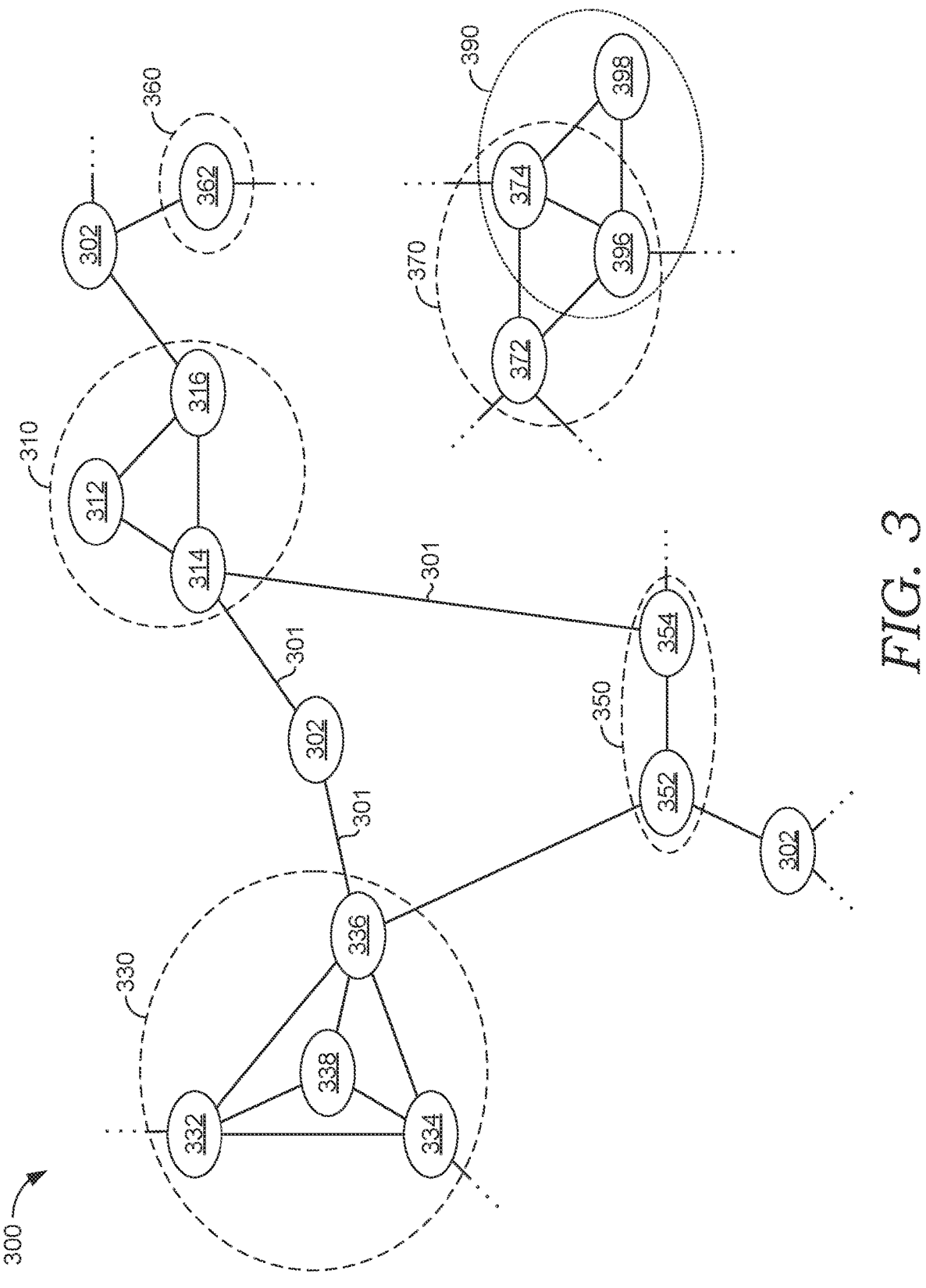
FIG. 3 is a schematic diagram of an example host navigation graph (HNG), in accordance with an embodiment of the present disclosure.

From the HNG, one or more clusters are determined. In one example, a cluster refers to a grouping of nodes corresponding to respective hosts and that are connected to each other via respective edges. In some embodiments, the nodes in a cluster are related to each other in that they share at least one feature with each other. For example, a cluster includes nodes that are connected to a particular reference node via respective edges. One example of a cluster includes a clique, and in at least one example discussed herein, the terms "cluster" and "cliques" are broadly utilized to refer to each other. In the context of graph theory, in an example, a "clique" refers to a portion of the graph (for example, the HNG), where the portion corresponds to a subset of vertices formed by one or more edges joining at a node. In one embodiment, a clique includes a subset of vertices in an HNG, such that every pair of distinct vertices in the subset of vertices is connected by an edge. Example cliques are illustrated in FIG. 3. By employing cliques, certain embodiments disclosed herein generate insights into the structure, connectivity, and patterns within the HNG, such as those related to a host authority value.

Any suitable algorithm may be employed to extract any number of features from a clique. By way of a non-limiting example, certain embodiments of this disclosure employ Bron-Kerbosch Clique Graph Mining. A computing system employing Bron-Kerbosch Clique Graph Mining accesses a seed list of known low-authority hosts. In one example, the low-authority hosts are accessed from a data source storing records of known low-authority hosts. Example data sources storing records of known low-authority hosts include data sources managed or contributed to by NewsGuard®. Based on the records of known low-authority hosts or other data in the HNG, cliques showing close-knit navigation activity are identified. In one example, "close-knit navigation activity" refers to a sequence or pattern of navigations and associated parameters (for example, timing of navigation, duration at a particular host, prior host authority values of a particular host, and so forth) to or from a particular host. For example, close-knit navigation activity is determined by accessing, from the navigation data, prior navigations within a threshold value of time that form a sequence of navigations to the first host, and determining at least one feature for each prior navigation of the sequence of navigations. In one example, the close-knit navigation activity is used to identify cliques, clusters, or features associated with hosts in the clique.

Continuing the example of employing the Bron-Kerbosch Clique Graph Mining algorithm, any number of features are determined. For example, a computing system employing the Bron-Kerbosch Clique Graph Mining algorithm determines, among any other features, a first feature indicative of a cluster size (or clique size) of a largest cluster (or clique) to which the first host belongs; a second feature indicative of the mean size of clusters (or cliques) associated with the first host; a third feature indicative of the cumulative size of all clusters (or cliques) to which the first host is associated with; a fourth feature indicative of the number of clusters (or cliques) in which the first host is contained; a fifth feature indicative of a percentage of clusters (or cliques) of the clusters (or cliques) in which the host is contained, that include low-authority hosts and in which the first host is contained, wherein the percentage of clusters (or cliques) is determined by dividing the total number of clusters (or cliques) in which the first host is contained by the number of clusters (or cliques) to which the first host is contained and that include the low-authority hosts; a sixth feature indicative of a cardinality of the first host, wherein the cardinality of the first host comprises an indication of a presence of the first host in the HNG; a seventh feature indicative of a view count of the first host, wherein the view count comprises an aggregate number of views garnered by the host over a period of time; an eighth feature indicative of a frequency with which the first host and a second host coexist in the HNG; or a ninth feature indicative of a regularity with which the first host and the second host share a similar cluster (or clique).

Embodiments employing the Bron-Kerbosch Clique Graph Mining algorithm identify maximal cliques within the HNG, helping to recognize patterns not possible employing other techniques. However, it should be understood that the embodiments disclosed herein are not limited to employing the Bron-Kerbosch Clique Graph Mining algorithm to determine these nine features.

Figure 4B:
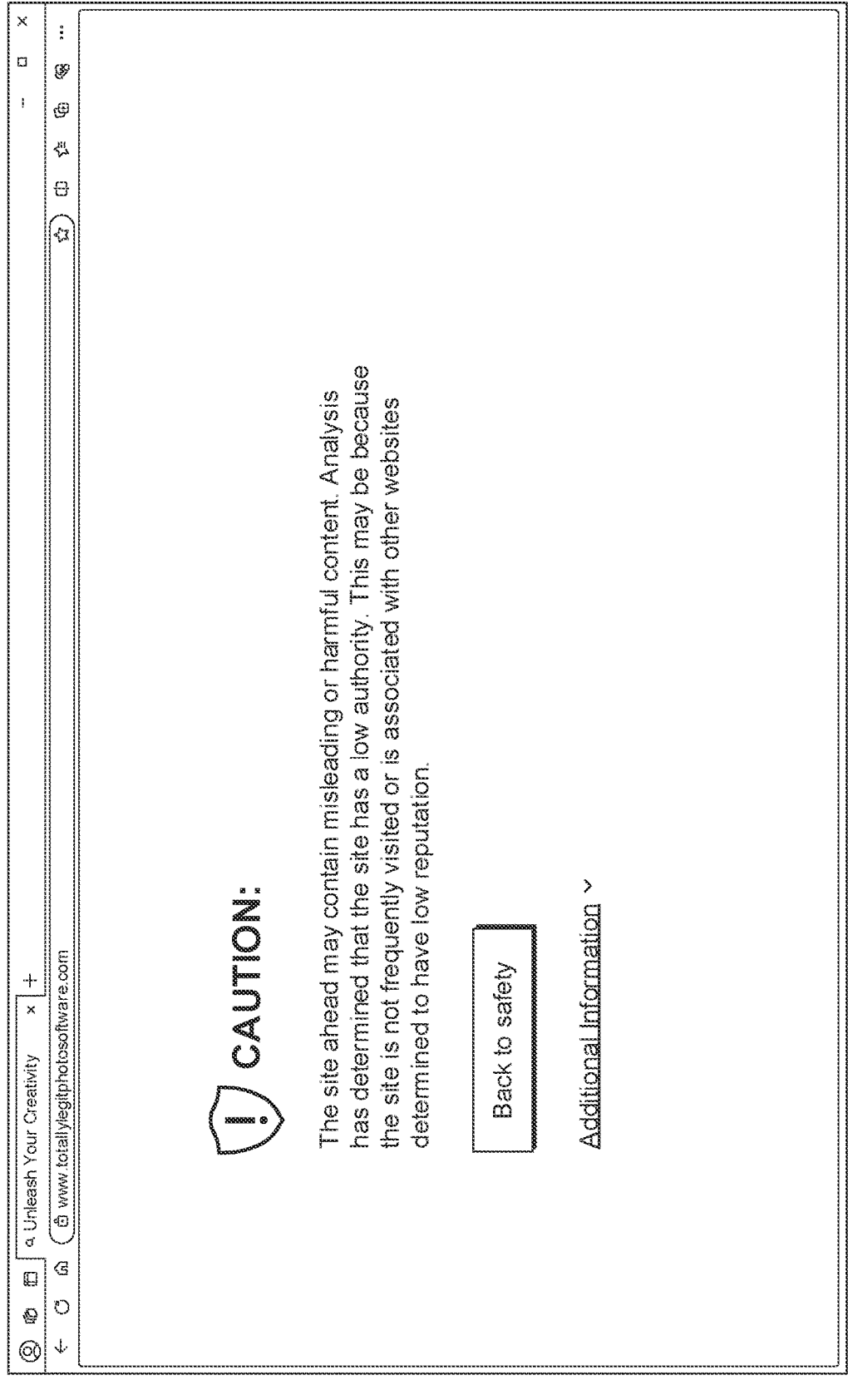
FIG. 4B is a screenshot of a second example interface that includes a splash screen overlaid over a browser, in accordance with an embodiment of the present disclosure.

From features extracted for a particular host and/or the clique, certain embodiments disclosed herein determine a host authority value for a particular host associated with a particular node in the HNG. Based on the host authority value, an indication indicative of a reliability of a particular host is generated or any other suitable remedial action can be taken. For example and as illustrated in FIG. 4A, suppose a user performs a search for a particular topic. The third search result surfaced by the search engine catches the attention of the user, who hovers their cursor over the hyperlink associated with the host indicated by the third search result. Based on the user interaction (in this example, hovering a cursor over the hyperlink), a pop-up window indicating that the host of the third search result is associated with a low-authority host is generated. Other examples of indications indicative of the reliability of a particular host are illustrated in FIGS. 4B, 4C, and 4D.

Certain embodiments of this disclosure assemble and build a data set of known low-authority hosts (for example, nodes of the HNG) and other hosts (for example, other hosts of the HNG) connected to the low-authority host via navigations (for example, edges of the HNG). In some embodiments, this built data set is used as training data used to train a neural network having any number of layers. One example neural network includes an input layer, at least one intermediate hidden layer, and a culminating classification layer that is trained to classify a host received via the input layer. In one embodiment, the neural network employs the features (for example, any of the nine features determined using the Bron-Kerbosch Clique Graph Mining algorithm). Instead of setting linear thresholds or combinations thereof for these features, certain embodiments disclosed herein are better equipped to handle the non-linear relationship associated with any combination of features.

With this in mind, embodiments discussed herein provide a technical solution to the deficiencies and limitations of existing technologies associated with identifying and taking a mitigation action in response to identifying a low-authority host. Indeed, embodiments discussed herein bridge the gap in understanding between high-cardinality hosts and low-cardinality hosts, the latter or former of which are ignored by certain existing approaches that instead produce an incomplete understanding of an ever-growing number of hosts making information accessible via the web. For example, the disclosed multilayered analysis performs graph mining, neural network building, and training to determine a host authority value indicative of a reliability of the host. Thereafter, a mitigation action, such as generating a warning or other indication of a low-authority host to proactively deter interaction with these low-priority hosts, is performed. Alternatively, the mitigation action may include any other suitable action, such as ranking the hosts based on their respective authority values, such that hosts with lower authority value are ordered after hosts with a higher authority value, thereby reducing the likelihood that hosts with low-authority values are surfaced toward the top of a search by a search engine.

Particular embodiments have the technical effect of improved generation of HNGs. This is because various embodiments implement the technical solutions of accessing navigation data, including navigations between hosts to determine a pattern of nodes connected by edges. Using a nodal representation of nodes and edges with respective weights there between allows a neural network to efficiently consume the navigation activity data to train and implement a classifier with improved accuracy for determining higher or low-authority hosts. At most, existing techniques attempt to use browsing history, which is not readily consumable by a neural network and which fails to include a graphical representation from which features can be extracted. Indeed, certain existing techniques fail to provide computing logic to generate the HNG as disclosed herein, for example, using the features described herein.

Particular embodiments have the technical effect of reducing oversight and bias in determining an authenticity of a host. Whereas existing techniques are prone to biases by ignoring low- or high-authority hosts, certain embodiments disclosed herein determine any number of features for a host within a clique. These features can focus on a pattern and relationship of hosts related via navigations, instead of focusing solely on cardinality of hosts. For example, high-cardinality hosts can influence the perception of the importance or relevance of the high-cardinality host, causing an inherent bias. That is, high-cardinality hosts, with many connections, may overshadow those with fewer connections, potentially skewing the interpretation of the underlying data. By leveraging features within a clique, bias can be reduced by better evaluating close-knit navigation activity. Additionally, employing the neural network disclosed herein reduces the cardinality bias inherent in certain existing techniques, resulting in higher precision detection of low-authority hosts, irrespective of the host's cardinality. Instead of being limited by the linear constraints of the metrics, the neural network provides a broader, more holistic understanding, identifying low-authority hosts with heightened precision. In this manner, a more appropriate mitigation action, with less inaccuracies resulting from certain biases, can be generated.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*a* and 102*b* through 102*n*; a number of data sources, such as hosts 104*a* and 104*b* through 104*n*; server 106; browsers 103*a* and 103*b* through 103*n*; and network 110. It should be understood that the operating environment 100 shown in FIG. 1 is an example of one suitable operating environment. Each of the components shown in FIG. 1 is implemented via any type of computing device, such as computing device 800 illustrated in FIG. 8, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, browsers, search engines, servers, hosts, and data sources can be employed within operating environment 100 within the scope of the present disclosure. Each may comprise a single device or multiple devices cooperating in a distributed environment, such as the distributed computing environment 900 in FIG. 9. For instance, server 106 is provided via multiple devices arranged in a distributed environment that collectively provides the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Embodiments of server 106 comprise server-side software designed to work in conjunction with client-side software on user devices 102*a* and 102*b* through 102*n* so as to implement any combination of the features and functionalities discussed in the present disclosure. In one example, user device 102*a* receives user inputs via a browser 103*a* to allow access via network 110 to the server 106 or hosts 104*a* and 104*b* through 104*n*. For example, user inputs into a browser 103 causes a browser 103 to access any number of hosts 104, for example, via a search engine. In one example, user queries are submitted to a search engine, which generates search results responsive to those queries. In one embodiment, the server 106 runs a search engine, such as MICROSOFT® BING®, and provides, as search results, information from hosts 104*a* and 104*b* through 104*n*. For example, the server 106 generates a search engine results page (SERP) that is communicated over network 110 to be presented on the browser 103*a* of user device 102*a*. In some embodiments, the server 106 accesses navigation data indicative of navigations, within browser 103*a*, between hosts 104*a* and 104*b* through 104*n*. It should be understood that the division of operating environment 100 is provided to illustrate one example of a suitable environment, and there is no requirement for each implementation that any combination of the illustrated components, such as server 106 and user devices 102*a* and 102*b* through 102*n*, remain as different or separate entities.

In some embodiments, user devices 102*a* and 102*b* through 102*n* comprise any type of computing device capable of use by a user. For example, in one embodiment, user devices 102*a* and 102*b* through 102*n* are the type of computing device 800 described in relation to FIG. 8. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a Global Positioning System (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, hosts 104*a* and 104*b* through 104*n* includes computer or other device connected to network 110 and is capable of hosting or accessing any suitable content from any number of data sources. In one embodiment, a host is a node that participates in user applications, either as a server, client, or both. An example host operates as a server offering information resources, such as websites, documents, and other online destinations for navigation; services, such as e-commerce, e-mail, chat, blogging, and streaming; and applications, such as productivity applications, web-based applications, browsers, and the like, to other users or other hosts on the network. In one embodiment, one or more hosts 104*a* and 104*b* through 104*n* provide (or make available for accessing) an API response based on an API call. In one embodiment, one or more hosts 104*a* and 104*b* through 104*n* correspond to endpoints. The hosts 104*a* and 104*b* through 104*n* may be identified via corresponding assigned network addresses, such as IP addresses. Certain hosts 104*a* and 104*b* through 104*n* provide access to data from data sources that are discrete from user devices 102*a* and 102*b* through 102*n* and server 106 or are incorporated and/or integrated into at least one of those components. Examples of data made available by hosts 104*a* and 104*b* through 104*n* can include any suitable data discussed herein.

Figure 2:
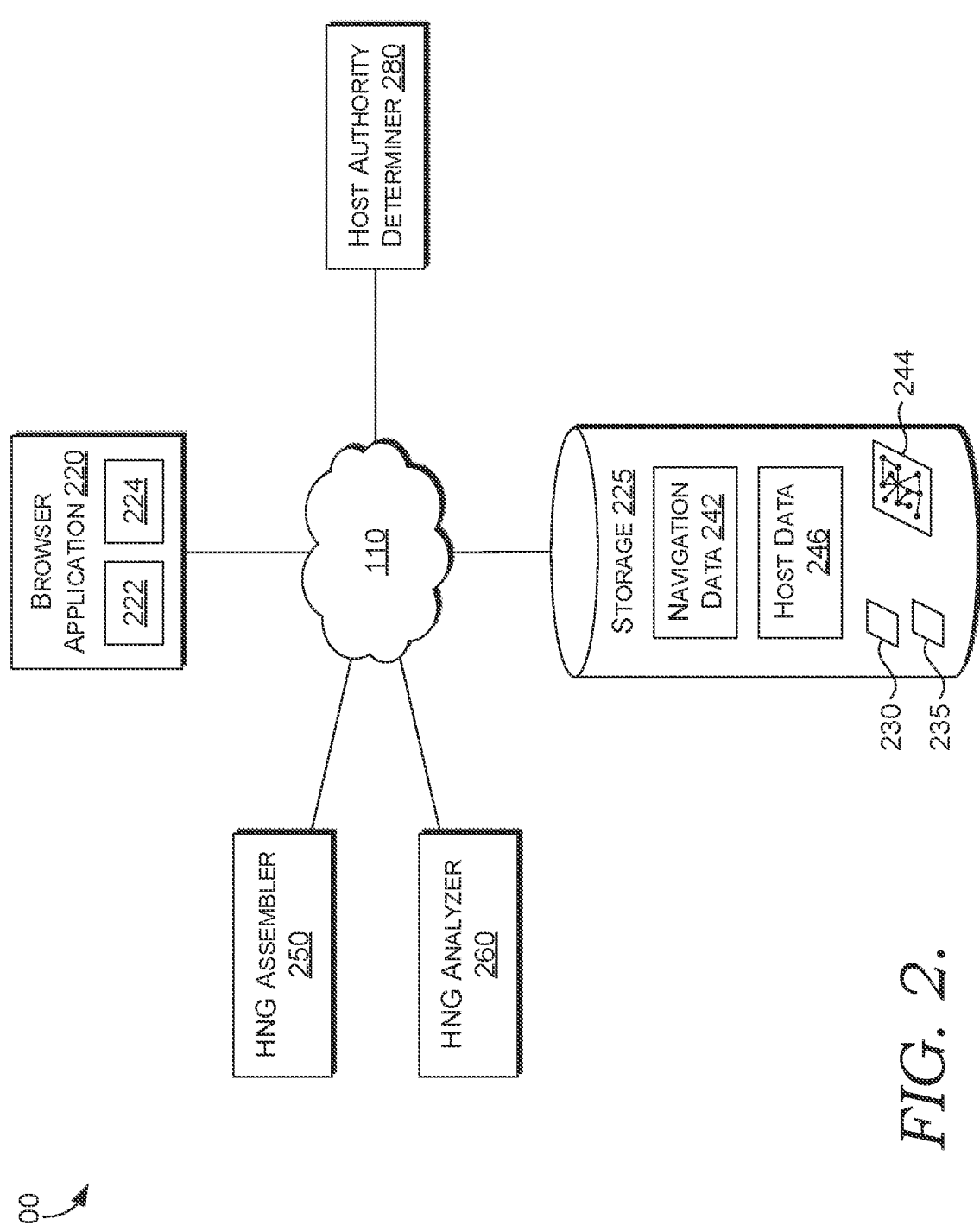
FIG. 2 is a block diagram depicting an example computing architecture suitable for implementing aspects of the present disclosure.

Operating environment 100 can be utilized to implement one or more of the components of system 200, as described in FIG. 2, to perform any suitable operations, such as receiving and logging navigations from host to host; generating an HNG with various nodes and edges; programmatically analyzing the HNG to determine any suitable feature associated with a node corresponding to a host; determining a host authority value indicative of a level of reliability of a host; and/or classifying a host; causing a mitigation action to be performed based on the host authority value of the host. Operating environment 100 can also be utilized for implementing aspects of methods 500, 600, and 700 in FIGS. 5, 6, and 7, respectively.

Referring now to FIG. 2, depicted is a block diagram of an example system 200 including a browser application 220 having a navigation logger 222 and a host authority handler 224; a storage 225 including HNG analysis logic 230, host authority logic 235, navigation data 242, HNGs 244, and host data 246; an HNG assembler 250; an HNG analyzer 260; and a host authority determiner 280, in accordance with an embodiment of the present disclosure. Example system

200 is not limited to the illustrated components, as certain components can be omitted and/or combined, and/or other components added.

Moreover, certain components, functions performed by these components, or services carried out by these components are implemented at appropriate abstraction layer(s), such as the operating system layer, application layer, hardware layer, etc., of the computing system(s). Alternatively, or in addition, certain functionality of these components and/or the embodiments described herein is performed, at least in part, by one or more hardware logic components. For example, and without limitation, illustrative types of hardware logic components include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components can be shared or distributed across other components.

With reference to the browser application 220, embodiments of the browser application 220 include a software application for accessing websites and the internet via any suitable device, such as the user device 103*a* of FIG. 1. In one embodiment, the browser application 220 includes a graphical user interface (GUI) including any number of buttons, control, text fields, or other features to allow users to navigate between hosts, such as the hosts 104*a* and 104*b* through 104*n* of FIG. 1. As a first example, the browser application 220 allows multiple web pages associated with one or more hosts to be open at the same time, either in different browser windows or in different tabs of the same window. As a second example, the browser application 220 includes back and forward controls or buttons selectable to toggle between different web pages associated with a host, for example, to go to the next or previous web page. As a third example, the browser application 220 includes a refresh or reload and a stop control or button selectable to reload and cancel loading of the current page. As a fourth example, the browser application 220 includes a home control or button selectable to return to the user's home page. As a fifth example, the browser application includes an address bar configured to receive an input, such as a string of alphanumeric characters or other text corresponding to the URL of a page, and to display it. In one embodiment, the browser application 220 includes a search bar that receives as an input certain terms that are communicated to a search engine. In one example, the search bar is merged with the address bar.

Continuing with the browser application 220, the navigation logger 222 generally receives an indication of navigations of a user toggle between or to hosts and stores a record of information associated with the navigations. Certain embodiments of the navigation logger 222 are embodied as a computer program or routine running on or in association with the browser application 220. In one embodiment, the user browsing activity received by the navigation logger 222 is stored as a record or other data structure indicating that a particular user navigated from one host to another host. For example, the navigation logger 222 receives an indication of a user navigating from a first host to a second host and subsequently stores a record or other data structure of navigation data 242 indicating a navigation from the first host to the second host. In this example, the navigation logger 222 associates this record of navigation data 242 with the user via the user's profile or account. In one example, navigation data is also referred to as "user-navigation data."

In some embodiments, the navigation logger 222 receives an indication of user inputs, such as user browsing activity, into the browser application 220. In some embodiments, the navigation logger 222 receives and stores user browsing activity from one user or a group of user. In one embodiment, the navigation logger 222 receives an indication of user browsing activity as a result of user inputs into any of the buttons, control, text fields, or other features disused herein, as the user navigates to or between hosts. For example, a user inputting a URL into a search bar address bar and navigating to the input URL causes a record of navigation data 242 to be generated, indicating that the user navigated from the search engine to the input URL.

It should be understood that the navigation data 242 is not limited to navigations between websites of different hosts. For example, navigation logger 222 alternatively or additionally receives navigation data 242 indicating that a user navigated from a website to a file share, to a service, to an application, or other content. In some embodiments, the navigation logger 222 determines a direction of the navigation. For example, the navigation logger 222 classifies the host from which the user is navigating as the "referring host" or the "referrer," and/or classifies the host to which the user is navigating as the "referred host." However, in some embodiments, the direction of the navigation is omitted, such that the navigation data 242 indicates that a navigation occurred between hosts irrespective of the direction of the navigation. Navigation data 242 may be received from a variety of sources and may be available in a variety of formats.

User browsing activity, in one example, comprises any information that is related to a person and that person's interactions within or in association with browser application 220, among other information. By way of example and without limitation, navigation logger 222 accesses any other suitable data, such as: audio information (for example, an audio file received from a particular host); textual information (for example, a document received from a host and having text); contact information (for example, email, instant message, phone, and so forth); location information (for example, a person's current location or location of a particular office where they work); presence; user-related activity, which may comprise activity relevant to a user or group member, such as communication information (for example, past email, meetings, chat sessions, communication patterns or frequency, information about a user, and the like), file access (for example, a file created, modified, or shared), social media or online activity (such as a post to a social media platform or website), subscription information, information regarding topics of interest to a user, or other user-related activity that may be determined via a user device (such as user device 102*a* of FIG. 1); information about a group or group member that they may choose to share (for example, birthday, anniversary, etc.); or information in common with the user (for example, common project teams, work groups, backgrounds, education, interests, or hobbies).

In some embodiments, any personally identifying data (for example, user data that specifically identifies particular users) is either not uploaded or otherwise provided from the one or more data sources, is not permanently stored, is de-identified, and/or is not made available to other components of system 200, for example. In addition or alternatively, a user may opt in or out of services provided by the technologies described herein and/or select which user-communication data and/or which sources of user-communication data are to be captured and utilized by these technologies. For example, navigation logger 222 is prohibited from accessing user browsing activity if a user has not opted in to a particular service. In certain embodiments, the navigation logger 222 removes identification data from navigation data 242 and/or user browsing data. For example, embodiments of the navigation logger 222 do not track or log user information, and instead track and log navigation information that is not associated with a particular user or user account. For example, the navigation logger 222 determines and stores navigation data by accessing crowdsourced navigation activity data from user accounts that have opted in to a data sharing policy.

Continuing with the browser application 220, host authority handler 224 is generally responsible for using the host authority value to present information indicating the score to the user, such as is shown in FIGS. 4B-4D. In some embodiments, the host authority handler 224 is implemented as a plug-in, software package, or patch into the browser application 220. The host authority handler 224 may be implemented in the browser, the server (such as server 106 of FIG. 1), or distributed to both.

In some embodiments, the host authority handler 224 accesses the host data 246 from storage 225, which includes identification of hosts (for example, host ID or URL) and corresponding host authority value, and performs a mitigation action within the browser application 220 based on the corresponding host authority value. For example, the host authority handler 224 accesses a host authority value indicating that the particular host is classified as a low-authority host, and subsequently performs a mitigation to reduce the negative effects associated with a user interacting with a low-authority host. An example mitigation action performed by host authority handler 224 includes generating a GUI element within the browser application 220 to notify a user of the reliability of a particular host, for example, before, during, or after a user interacts with the host. One example GUI element includes an indication that a host associated with a Uniform Resource Locator (URL) surfaced on a search engine corresponds to a low-authority host, so as to deter user interaction with the low-authority host.

Continuing with FIG. 2, the HNG assembler 250 is generally responsible for generating and updating an HNG, such as the HNG illustrated in FIG. 3. Embodiments of the HNG assembler 250 access the navigation data 242 from storage 225 and generate an HNG based on the accessed navigation data 242. For example, the HNG assembler 250 determines hosts and navigations between nodes from the navigation data 242. Continuing this example, the HNG assembler 250 assigns a first host to a first node, assigns a second host to a second node, and assigns a navigation between the first and second nodes as an edge. In some embodiments, this process of assigning hosts to nodes and navigations to edges is repeated for navigation data 242 from a one or more users, thereby building a rich graph with a plurality of nodes and edges showing navigations between hosts. In one embodiment, the HNG assembler 250 generates the HNG 244 with undirected edges, such that the direction of the navigation between hosts is omitted or not stored as part of the HNG 244. In another embodiment, the HNG assembler 250 generates the HNG 244 with directional edges, such that the direction of the navigation between hosts is stored as part of the HNG 244.

In some embodiments, the HNG assembler 250 only uses edges if the navigation data 424 includes a threshold number of navigations associated with at least one host. In one embodiment, the HNG assembler 250 ignores or deletes from storage 225 navigation data that includes less than the threshold number of navigations associated with a particular host or pair of hosts. For example, suppose the threshold is three, such that the HNG assembler 250 only generates edges for navigations corresponding to at least three navigations between two hosts (or nodes). In this example, low-visibility hosts (for example, those having less than three navigations) are omitted from the HNG. In this manner, low-visibility hosts are deleted, not stored, or not accessed to save on storage space so as to not inefficiently store data for low-visibility hosts (for example, those hosts not satisfying the threshold number of navigations). In some embodiments, not accessing low-visibility hosts reduces computational complexities that would otherwise be consumed in the HNG assembler 250 in processing data for these low-visibility hosts. Moreover, although certain examples discuss the threshold as being three, it should be understood that the threshold many be any suitable quantity, such as two, four, five, six, ten, fifteen, twenty, one-hundred, and so forth.

In some embodiments, the HNG assembler 250 generates the HNG and stores the HNG as HNG(s) 244 in storage 225. In some embodiments, the HNG assembler 250 updates the HNG(s) 244 as new navigation data 242 becomes available. For example, the navigation logger 222 may push navigation data 242 to the HNG assembler 250 to cause the HNG assembler 250 to update the HNG(s) 244. As another example, the HNG assembler 250 may periodically at preset or random times perform a search against storage 225 for navigation data 242. In this example, if the storage 225 includes new navigation data 242, the HNG assembler 250 accesses the navigation data 242 and updates existing HNG(s) 244 or generates new HNG(s). In one embodiment, updating the HNG 244 includes adding new edges indicative of new navigations, adding new nodes indicative of new hosts, and updating a weight associated with existing edges based on additional navigations to or from hosts associated with those edges and nodes.

Continuing with FIG. 2, HNG analyzer 260 is generally responsible for determining information from HNGs 244 generated by the HNG assembler 150. Embodiments of the HNG analyzer 260 employ HNG analysis logic 230 to programmatically analyze HNG(s) 244 to determine information, such as at least one feature associated with the HNG(s) 244 and corresponding nodes and edges. In some embodiments, the HNG analyzer 260 accesses the HNG(s) 244 and extracts or receives host data 246. In some embodiments, the host data 246 includes information organized in any suitable data structure or format and associated with the HNG(s) 244. In some embodiments, the host data 246 includes supplemental information, such as labels associated with certain hosts. For example, the host data 246 includes a data structure with a listing, such as a seed list, of known low-authority hosts and associated information. In one example, data sources storing records of known low-authority hosts include data sources managed or contributed to by NewsGuard®.

Based on the records of known low-authority hosts or other data in the HNG, embodiments of the HNG analyzer 260 determine clusters (for example, cliques) showing close-knit navigation activity to a known low-authority host. In one embodiment, the HNG analyzer determines a cluster associated with a host for which a classification is to be determined (for example, for a host surfaced on the browser application 220) based on the close-knit navigation activity. In one example, "close-knit navigation activity" refers to a sequence or pattern of navigations and associated parameters (for example, timing of navigation, duration at a particular host, prior host authority values of a particular host, and so forth) to or from a particular host. For example, close-knit navigation activity is determined by the HNG analyzer by accessing, from the navigation data 242, prior or subsequent navigations within a threshold value of time that form a sequence of navigations to a particular host, and determining at least one feature for each prior navigation of the sequence of navigations. In one example, the close-knit navigation activity is used to identify cliques, clusters, or features associated with hosts in the clique. Embodiments of the HNG analyzer 260 determine close-knit navigation activity by: receiving a user interaction with a component associated with a particular host; accessing, from the navigation data, prior navigations within a threshold value of time that form a sequence of navigations to the particular host; and determining at least one feature for each prior navigation of the sequence of navigations, such that the host authority value for the first host is determined based on the at least one feature.

In one embodiment, the HNG analyzer 260 determines clusters or cliques. In one example, a "clique" refers to a portion of the HNG 244, where the portion corresponds to a subset of vertices formed by one or more edges joining at a node. In one embodiment, the HNG analyzer 260 identifies the subset of vertices in the HNG 244 in which every pair of distinct vertices in the subset of vertices is connected by an edge, and classifies this subset of vertices as a "clique." Example cliques are illustrated in FIG. 3. By employing cliques, certain embodiments of the HNG analyzer 260 generate insights into the structure, connectivity, and patterns within the HNG 244, such as those related to a host authority value.

Embodiments of the HNG analyzer 260 employ HNG analysis logic 230 to implement any suitable algorithm, such as a graph theory algorithm. Certain embodiments of the HNG analysis logic 230 include computer instructions for processing data associated with HNG(s) 244 to determine various metrics or to determine insights for use in determining authority of hosts in the HNG. For example, HNG analysis logic 230 includes logic for determining cliques or clusters. As another example, HNG analysis logic 230 includes logic for filtering the cliques or clusters, nodes, edges, and so forth. In another example, HNG analysis logic 230 includes logic for analyzing the HNG 244 to determine metrics or values for various HNG features.

By way of non-limiting example, suppose the HNG analyzer 260 employs HNG analysis logic 230 to implement the Bron-Kerbosch Clique Graph Mining algorithm. By employing the Bron-Kerbosch Clique Graph Mining algorithm, the HNG analyzer determines, among any other features, a first feature indicative of a cluster size of a largest cluster to which a particular host belongs; a second feature indicative of the mean size of clusters associated with the particular host; a third feature indicative of the cumulative size of all clusters to which the particular host is associated with; a fourth feature indicative of the number of clusters in which the particular host is contained; a fifth feature indicative of a percentage of clusters, of the clusters in which the host is contained, that include low-authority hosts, and in which the particular host is contained, wherein the percentage of clusters is determined by dividing the total number of clusters in which the particular host is contained by the number of clusters to which the particular host is contained and that include the low-authority hosts; a sixth feature indicative of a cardinality of the particular host, wherein the cardinality of the particular host comprises an indication of a presence of the particular host in the HNG; a seventh feature indicative of a view count of the particular host, wherein the view count comprises an aggregate number of views garnered by the host over a period of time; an eighth feature indicative of a frequency with which the particular host and another host coexist in the HNG; or a ninth feature indicative of a regularity with which the particular host and the other host share a similar cluster.

In some embodiments, output of the HNG analyzer 260, including the identified cliques, the determined features for hosts, and other information determined from host data 246 is stored in storage 225 as enriched HNG data, for example, as part of the HNG 244. Example enriched HNG data includes information about clusters (for example, cliques), and various host features (for example, any of the nine features determined using the Bron-Kerbosch Clique Graph Mining algorithm). In some embodiments, the enriched HNG data output by the HNG analyzer 260 includes a host ID and a corresponding feature vector for the host or corresponding metadata for the host indicating values for any number of features. In some embodiments, the HNG analyzer 260 only generates and stores a feature vector for certain hosts. For example, the HNG analyzer 260 generates and stores feature vectors for each host ID, for a subset of host IDs, and for host IDs of hosts (or corresponding nodes) satisfying certain parameters (such as the threshold number of navigations, and other parameters).

Continuing with FIG. 2, the host authority determiner 280 is generally responsible for determining the host authority value and classifying the authority of a host. Some embodiments of host authority determiner 280 utilize host authority logic 235 to analyze the host data 246, enriched HNG data, and the HNG 244; determine the host authority value and classify a corresponding host. In one embodiment, host authority logic 235 comprises computer instructions including rules, conditions, associations, predictive models, classification models, or other criteria for, among other operations, determining the host authority value and classifying a corresponding host. Host authority logic 235 may take different forms, depending on the particular type of HNG 244 or host. In some embodiments, host authority logic 235 comprises any suitable rules, such as Boolean logic, classifiers, various decision trees (for example, random forest, gradient-boosted trees, or similar decision algorithms), conditions or other logic, fuzzy logic, neural network, finite state machine, support vector machine, machine-learning techniques, or combinations of these to determine (or facilitate determining) the host authority value, classification of the authority level of a corresponding host, or other related information for a host or HNG 244 according to embodiments described herein.

Certain embodiments of host authority logic 235 include logic, rules, models, conditions, computer instructions, and so forth, that are used to determine the authority of a host, and/or are used to train models for determining host authority. In some embodiments, the HNG analysis logic 230 includes logic that the HNG analyzer 260 uses to classify hosts according to authority using the classification model. In one embodiment, host authority logic 235 comprises an artificial neural network that determines (for example, classifies) authority for a host based on the host's corresponding feature vector or metadata regarding the various metrics. For example, the host authority determiner 260 utilizes host authority logic 235 to classify the host based on the enriched HNG data, the HNG 244, the cliques, or the features (for example, any of the nine features determined via Bron-Kerbosch Clique Graph Mining).

Turning to FIG. 3, depicted is a schematic diagram of an example host navigation graph (HNG) 300, in accordance with an embodiment of the present disclosure. As illustrated, the HNG 300 includes a plurality of nodes, such as nodes 302, and edges, such as edges 301. For example, each edge 301 connects two nodes 302. As discussed herein, certain nodes represent hosts, and certain edges represent a navigation from one host (represented as a node connected to one end of the edge) to another host (represented as the other node on the other end of the edge). In some embodiments, an edge represents at least a plurality of navigations from the nodes it connects. In one example, the edge represents at least a threshold number of navigations, such as at least three navigations.

Example HNG 300 also includes several examples of clusters 310, 330, 350, 370, and 390, each indicating close-knit navigation activity among a group of nodes. Specifically, illustrated clusters 310, 330, 350, 370, and 390 are cliques. In one example, the cliques refers to a type of cluster that is a subset of nodes of an undirected graph such that every two distinct nodes in the clique are adjacent. Because nodes represent hosts, each of these example cliques 310, 330, 350, and 370 comprises a plurality of hosts to which a user has navigated, as indicated by the edges. In this example, each edge corresponds to a navigation from one host to another host in the clique.

First example clique 310 includes three nodes: nodes 312, 314, and 316. Second example clique 330 includes four nodes: nodes 332, 334, 336, and 338. Third example clique 350 includes two nodes: nodes 352 and 354. Some embodiments of the HNG analyzer 260 in FIG. 2 will exclude clique 350 from analysis because some embodiments consider only cliques having at least a threshold number of nodes, such as at least three nodes, as discussed herein. Fourth example clique 360 includes only one node: node 362. Some embodiments of the HNG analyzer 260 in FIG. 2 will exclude clique 360 from analysis because some embodiments consider only cliques having at least a threshold number of nodes, such as at least three nodes, as discussed herein. Fifth example clique 370 includes three nodes: nodes 372, 374, and 396. Sixth example clique 390 includes nodes 374, 396, and 398. Certain nodes, such as illustrated nodes 374 and 396, can be shared in more than one clique. It should be understood that the illustrated cluster types are mere non-limiting examples of cliques in HNG 300, and additional or alternative cluster variations can be generated by HNG assembler 250 and analyzed by HNG analyzer 260.

In one example, a clique is a subset of vertices of an undirected HNG 300, such that every two distinct vertices in the clique are adjacent. That is, one example clique of an HNG is an induced subgraph that is complete. Mathematically, a clique, C, in an undirected graph, G=(V, E), is a subset of the vertices, $C \subseteq V$, such that every two distinct vertices are adjacent. This may be equivalent to the condition that the induced subgraph of G induced by C is a complete graph. In some cases, the term clique may also refer to the subgraph directly.

As discussed herein, embodiments of the HNG analyzer 260 of FIG. 2 determines any suitable features or metrics from the HNG 300. By way of example, first, in some embodiments, the HNG analyzer 260 determines, from HNG 300, a "maximal clique," which in one example, is a clique that cannot be extended by including one more adjacent vertices. For example, the maximal clique is a clique that does not exist exclusively within the vertex set of a larger clique. Second, in some embodiments, the HNG analyzer 260 determines, from HNG 300, a "maximum clique," which in one example corresponds to a clique, such that there is no clique with more vertices. In one example, the clique number ω(G) of a graph G, such as the HNG 300, is the number of vertices in a maximum clique in G. Third, in some embodiments, the HNG analyzer 260 determines, from HNG 300, an "intersection number," which in one example corresponds to the smallest number of cliques that together cover all edges of G. Fourth, in some embodiments, the HNG analyzer 260 determines, from HNG 300, a "clique cover number," which in one example corresponds to the smallest number of cliques of HNG 300 whose union covers the set of vertices V of the graph. Fifth, in some embodiments, the HNG analyzer 260 determines, from HNG 300, a "maximum clique transversal," which in one example corresponds to a subset of vertices with the property that each maximum clique of the graph contains at least one vertex in the subset.

FIG. 4A is a screenshot 410 of a first example interface that includes a browser 412 containing search results 414 ordered based on corresponding authority scores, in accordance with an embodiment of the present disclosure. As illustrated, the browser application 220 (FIG. 2) displays a search results page containing search results 414 that have been ranked or ordered based on the corresponding host authority values. In this example, the search results corresponding to hosts having a higher host authority value are displayed above hosts corresponding to hosts having a lower host authority value.

In one embodiment, a server system implementing the search engine accesses the host authority values for the hosts being displayed and ordered as search results. In one example, the server ranks the search results to be displayed on a page based on the host authority value of the host in the search results. For example, suppose the server determines the top seven most relevant search results to be displayed in the web page. In this example, the server ranks the search results based on the host authority value of each corresponding host, such that the lower authority hosts are ordered after the higher authority hosts. Although this example illustrates aspects of the embodiments disclosed herein being implemented directly by a server implementing a search engine, such as BING® or GOOGLE®, it should be understood that the embodiments disclosed herein are not limited to a server implementing these embodiments in the manner depicted in FIG. 4A. For example, in some instances, the browser, such as browser application 220, implements certain embodiments disclosed herein.

To help illustrate, FIGS. 4B, 4C, and 4D depict an example browser implementing aspects of the embodiments disclosed herein. In some embodiments, a component of a browser, such as the host authority handler 224 of FIG. 2, performs a mitigation action, such as generating a GUI element with an indication of the reliability of a host. For example, FIG. 4B is a screenshot 420 of a second example interface that includes a splash screen 422 overlaid over a browser, in accordance with an embodiment of the present disclosure. In some embodiments, the splash screen is overlaid over a browser in response to a user interacting with a URL or hyperlink corresponding to a host determined to be a low-authority host, as described herein. As illustrated, the overlaid splash screen includes a visual indication and/or text warning the user of the potentially misleading or harmful content associated with a particular host.

In some embodiments, the mitigation action includes generating a more discrete GUI element or visual indication, such as a check mark (for a higher authority host) or an X mark (for a lower authority host); a thumbs-up icon (for a higher authority host) or a thumbs-down icon (for a low-authority host); or a color scheme, such as red (for a higher authority host), yellow (for a neutral authority host), or green (for a higher authority host). For example, FIG. 4C is a screenshot 430 of a third example interface that includes a browser having an icon 432 indicating that a corresponding website has a low-authority level, in accordance with an embodiment of the present disclosure. In some embodiments, the GUI element includes a binary indication indicating binary level of reliability, such as whether or not a corresponding URL of a list of search results is reliable or not reliable. One example mitigation action includes generating an indication indicative of the reliability of the host proximate to the URL or hyperlink associated with the host, such as the illustrated icon 432 indicative of an X-mark. As illustrated, the icon 432 is generated proximate to the search bar and includes an indication showing that the corresponding host (in this example, the website) is of a low authority. In some embodiments, the user selects the indication proximate to the search bar to view additional information.

To illustrate another example, FIG. 4D is a screenshot 440 of a fourth example interface that includes a pop-up window 442 overlaid on a browser, in accordance with an embodiment of the present disclosure. In one embodiment, the browser causes a pop-up window 442 to be generated in response to a user input or other condition being satisfied. For example, a user can hover their mouse cursor over one of the URLs. In response to receiving an indication of the user's hovering input, the browser causes a pop-up window 442 to be generated, providing an indication of the reliability of the corresponding host of the link. The pop-up window 442 can indicate that the corresponding URL is reliable or not reliable.

Turning now to FIGS. 5, 6, and 7, aspects of example process flows 500, 600, and 700 are illustratively depicted for some embodiments of the disclosure. Embodiments of process flows 500, 600, and 700 each comprise a method (sometimes referred to herein as method 500, 600, and 700) carried out to implement various example embodiments described herein. For instance, at least one of process flows 500, 600, and 700 is performed to programmatically generate, for a target communication item, a contextual title, which is used to provide any of the improved electronic communications technology or enhanced user computing experiences described herein.

Each block or step of process flow 500, process flow 600, process flow 700, and other methods described herein comprises a computing process performed using any combination of hardware, firmware, and/or software. For instance, various functions are carried out by a processor executing instructions stored in memory, such as memory 812 as described in FIG. 8 and/or as storage 225 as described in FIG. 2. Embodiments of the methods are also to be embodied as computer-usable instructions stored on computer storage media. Embodiments of the methods are provided by a standalone application, a service or hosted service (standalone or in combination with another hosted service), or a plug-in to another product, to name a few. For example, the blocks of process flows 500, 600, and 700 that correspond to actions (or steps) to be performed (as opposed to information to be processed or acted on) are carried out by one or more computer applications or services, in some embodiments, which operate on one or more user devices (such as user device 102a of FIG. 1), servers (such as server 106 of FIG. 1), and/or are distributed across multiple user devices, and/or servers, or by a distributed computing platform, and/or are implemented in the cloud, such as described in connection with FIG. 9. In some embodiments, the functions performed by the blocks or steps of process flows 500, 600, and 700 are carried out by components of system 200, as described in FIG. 2.

FIG. 5 depicts a flow diagram of a process 500 for providing an indication of a reliability of a host corresponding to a node in a Host Navigation Graph (HNG), in accordance with an embodiment of the present disclosure. At block 510, process 500 includes accessing navigation data comprising indications of navigations on a network of a plurality of hosts. In one embodiment, each navigation corresponds to a client navigating on the network between a referrer host and a referred host. At block 520, process 500 includes generating, based on the navigation data, a Host Navigation Graph (HNG) comprising nodes and edges. In one embodiment, each node corresponds to a respective host of the network. In one embodiment, each edge corresponds to at least one navigation between (1) at least one host of the plurality of hosts and (2) another host of the plurality of hosts. At block 530, process 500 includes determining, from the HNG, a first cluster comprising at least a portion of the HNG indicating close-knit navigation activity occurring within the portion. At block 540, process 500 includes determining, based on at least the first cluster and for a first node of the first cluster, a host authority value for a first host corresponding to the first node. At block 550, process 500 includes providing an indication indicative of a reliability of the first host based on the host authority value.

FIG. 6 depicts a flow diagram of a process 600 for causing presentation of a graphical user interface (GUI) element indicative of a host authority value for a host and determined based on a cluster of an HNG, in accordance with an embodiment of the present disclosure. At block 610, process 600 includes capturing, via a web browser, navigation data comprising indications of navigations on a network of a plurality of hosts. In one embodiment, each navigation corresponds to a client navigating between at least two hosts of the plurality of hosts. At block 620, process 600 includes transmitting the navigation data to a server system configured to access a plurality of navigation data from a plurality of users to generate a Host Navigation Graph (HNG) comprising nodes and edges. In one embodiment, each node corresponds to a respective host of the network, and each edge corresponds to a navigation from at least one host of the plurality of hosts to another host of the plurality of hosts. At block 630, process 600 includes receiving, from the server system, a host authority value for a first host of the plurality of hosts. In one embodiment, the first host corresponds to a first node of the HNG. In one embodiment, the host authority value is determined for the first host based on a first cluster comprising at least a portion of the HNG indicating close-knit navigation activity occurring within the portion. At block 640, process 600 includes causing presentation of a graphical user interface (GUI) element indicative of the host authority value for the first host.

Turning to FIG. 7, depicted is a flow diagram of a process 700 for transmitting a host authority value to the browser to cause the browser to perform a mitigation action based on the host authority value indicating that the first host corresponds to a low-authority host, in accordance with an embodiment of the present disclosure. At block 710, process 700 includes accessing navigation data comprising indications of navigations on a network of a plurality of hosts and in association with a browser. In one embodiment, each navigation corresponds to a client navigating on the network between at least two hosts of the plurality of hosts. At block 720, process 700 includes generating, based on the navigation data, a Host Navigation Graph (HNG) comprising a plurality of nodes and a plurality of edges. In one embodiment, each node corresponds to a respective host of the network. In one embodiment, each edge corresponding to a navigation between (1) at least one host of the plurality of hosts and (2) another host of the plurality of hosts. At block 730, process 700 includes determining, from the HNG, a first clique comprising at least a portion of the HNG indicating close-knit navigation activity occurring within the portion. At block 740, process 700 includes determining, based on at least the first clique and for a first node of the first clique, a host authority value indicative of a reliability of a first host corresponding to the first node. At block 750, process 700 includes transmitting the host authority value to the browser to cause the browser to perform a mitigation action based on the host authority value indicating that the first host corresponds to a low-authority host.

Other Embodiments

In some embodiments, a system, such as the computerized system described in any of the embodiments above, comprises at least one computer processor and computer storage media storing computer-useable instructions that, when used by the at least one computer processor, cause the system to perform operations. The operations comprise accessing navigation data comprising indications of navigations on a network of a plurality of hosts. Each navigation corresponds to a client navigating on the network between a referrer host and a referred host. The operations comprise generating, based on the navigation data, a Host Navigation Graph (HNG) comprising nodes and edges. Each node corresponds to a respective host of the network, and each edge corresponds to at least one navigation between (1) at least one host of the plurality of hosts and (2) another host of the plurality of hosts. The operations comprise determining, from the HNG, a first cluster comprising at least a portion of the HNG indicating close-knit navigation activity occurring within the portion. The operations comprise, determining, for a first node of the first cluster and based on at least the first cluster, a host authority value for a first host corresponding to the first node. The operations comprise providing an indication indicative of a reliability of the first host based on the host authority value.

In any combination of the above embodiments of the system, the host authority value for the first host is determined based on at least one feature comprising at least one of: a first feature indicative of a cluster size of a largest cluster to which the first host belongs; a second feature indicative of a mean size of clusters associated with the first host; a third feature indicative of a cumulative size of the clusters associated with the first host; a fourth feature indicative of a number of clusters in which the first host is contained; a fifth feature indicative of a percentage of clusters, of the clusters in which the host is contained, that include low-authority hosts and in which the first host is contained, such that the percentage of clusters is determined by dividing a total number of clusters in which the first host is contained by the number of clusters to which the first host is contained and that include the low-authority hosts; a sixth feature indicative of a cardinality of the first host, wherein the cardinality of the first host comprises an indication of a presence of the first host in the HNG; a seventh feature indicative of a view count of the first host, wherein the view count comprises an aggregate number of views garnered by the host over a period of time; an eighth feature indicative of a frequency with which the first host and a second host coexist in the HNG; or a ninth feature indicative of a regularity with which the first host and the second host share a similar cluster.

In any combination of the above embodiments of the system, the host authority value is determined using a classifier or artificial intelligence (AI) model that is trained on the at least one feature as related to the plurality of hosts.

In any combination of the above embodiments of the system, the first cluster corresponds to a clique, wherein the at least one feature is determined by performing a Bron-Kerbosch Clique Graph Mining algorithm.

In any combination of the above embodiments of the system, each edge of the HNG comprises at least three navigations.

In any combination of the above embodiments of the system, the first cluster comprises at least one clique comprising a subset of vertices formed by at least two nodes connected by at least one edge in the HNG, wherein the HNG is undirected.

In any combination of the above embodiments of the system, the first cluster has at least three nodes and at least one node of the at least three nodes corresponds to a host that has been predetermined to be of a low authority based on a data record for the at least one node.

In any combination of the above embodiments of the system, determining the first cluster comprises: accessing, from the HNG, a plurality of nodes; identifying, from the plurality of nodes, a set of nodes having at least a threshold number of navigations; and determining from the set of nodes, a subset of nodes sharing the close-knit navigation activity with the first host.

In any combination of the above embodiments of the system, the threshold number of navigations comprises at least three navigations.

In any combination of the above embodiments of the system, the operations further comprise determining the close-knit navigation activity by: receiving a user interaction with a component associated with the first host; accessing, from the navigation data, prior navigations within a threshold value of time that form a sequence of navigations to the first host; and determining at least one feature for each prior navigation of the sequence of navigations, wherein the host authority value for the first host is determined based on the at least one feature.

Various embodiments are directed to computer-implemented method. The method includes capturing, via a web browser, navigation data comprising indications of navigations on a network of a plurality of hosts. Each navigation corresponds to a client navigating between at least two hosts of the plurality of hosts. The method includes transmitting the navigation data to a server system configured to access a plurality of navigation data from a plurality of users to generate a Host Navigation Graph (HNG) comprising nodes and edges. Each node corresponds to a respective host of the network, and each edge corresponds to a navigation from at least one host of the plurality of hosts to another host of the plurality of hosts. The method includes receiving, from the server system, a host authority value for a first host of the plurality of hosts. The first host corresponds to a first node of the HNG. The host authority value is determined for the first host based on a first cluster comprising at least a portion of the HNG indicating close-knit navigation activity occurring within the portion. The method includes causing presentation of a graphical user interface (GUI) element indicative of the host authority value for the first host.

In any combination of the above embodiments of the computer-implemented method, the GUI element comprises at least one of: a binary indication indicating whether or not a corresponding Uniform Resource Locator (URL) of a list of search results is reliable or not reliable; a pop-up window indicating that the corresponding URL is reliable or not reliable; and a value indicative of a corresponding host authority level of a URL in proximity to the value.

In any combination of the above embodiments of the computer-implemented method, determining the navigation data comprises accessing crowdsourced navigation activity data from user accounts that have opted in to a data sharing policy.

In any combination of the above embodiments of the computer-implemented method, the host authority value for the first host is determined based on at least one feature comprising at least one of: a first feature indicative of a cluster size of a largest cluster to which the first host belongs; a second feature indicative of a mean size of clusters associated with the first host; a third feature indicative of a cumulative size of the clusters associated with the first host; a fourth feature indicative of a number of clusters in which the first host is contained; a fifth feature indicative of a percentage of clusters, of the clusters in which the host is contained, that include low-authority hosts and in which the first host is contained, such that the percentage of clusters is determined by dividing a total number of clusters in which the first host is contained by the number of clusters to which the first host is contained and that include the low-authority hosts; a sixth feature indicative of a cardinality of the first host, wherein the cardinality of the first host comprises an indication of a presence of the first host in the HNG; a seventh feature indicative of a view count of the first host, wherein the view count comprises an aggregate number of views garnered by the host over a period of time; an eighth feature indicative of a frequency with which the first host and a second host coexist in the HNG; or a ninth feature indicative of a regularity with which the first host and the second host share a similar cluster.

In any combination of the above embodiments of the computer-implemented method, the GUI element is presented on a browser application in response to an interaction with the first host displayed as one search result of an ordered listing on search results.

Various embodiments are directed to one or more computer storage media having computer-executable instructions embodied thereon that, when executed, by one or more processors, cause the one or more processors to perform operations. The operations include accessing navigation data comprising indications of navigations on a network of a plurality of hosts and in association with a browser, each navigation corresponding to a client navigating on the network between at least two hosts of the plurality of hosts; generating, based on the navigation data, a Host Navigation Graph (HNG) comprising a plurality of nodes and a plurality of edges. Each node corresponds to a respective host of the network, and each edge corresponds to a navigation between (1) at least one host of the plurality of hosts and (2) another host of the plurality of hosts. The operations include from the HNG, determining a first clique comprising at least a portion of the HNG indicating close-knit navigation activity occurring within the portion. The operations include determining, for a first node of the first clique and based on at least the first clique, a host authority value indicative of a reliability of a first host corresponding to the first node. The operations include transmitting the host authority value to the browser to cause the browser to perform a mitigation action based on the host authority value indicating that the first host corresponds to a low-authority host.

In any combination of the above embodiments of the one or more computer storage media, the host authority value is indicative of a binary level of reliability of the first host, wherein the binary level of reliability comprises a first indication indicating that the first host is the low-authority host having a low level of reliability or a second indication indicating that the first host is a high-authority host having a neutral or high level of reliability.

In any combination of the above embodiments of the one or more computer storage media, the host authority value for the first host is determined based on at least one feature comprising at least one of: a first feature indicative of a clique size of a largest clique to which the first host belongs; a second feature indicative of a mean size of cliques associated with the first host; a third feature indicative of a cumulative size of the cliques associated with the first host; a fourth feature indicative of a number of cliques in which the first host is contained; a fifth feature indicative of a percentage of cliques, of the cliques in which the host is contained, that include low-authority hosts and in which the first host is contained, such that the percentage of cliques is determined by dividing a total number of cliques in which the first host is contained by the number of cliques to which the first host is contained and that include the low-authority hosts; a sixth feature indicative of a cardinality of the first host, wherein the cardinality of the first host comprises an indication of a presence of the first host in the HNG; a seventh feature indicative of a view count of the first host, wherein the view count comprises an aggregate number of views garnered by the host over a period of time; an eighth feature indicative of a frequency with which the first host and a second host coexist in the HNG; or a ninth feature indicative of a regularity with which the first host and the second host share a similar clique.

In any combination of the above embodiments of the one or more computer storage media, the mitigation action comprises providing a visual indication of that the first host corresponds to the low-authority host.

In any combination of the above embodiments of the one or more computer storage media, determining the navigation data comprises accessing crowdsourced navigation activity data from user accounts that have opted in to a data sharing policy.

Example Computing Environments

Figure 8:
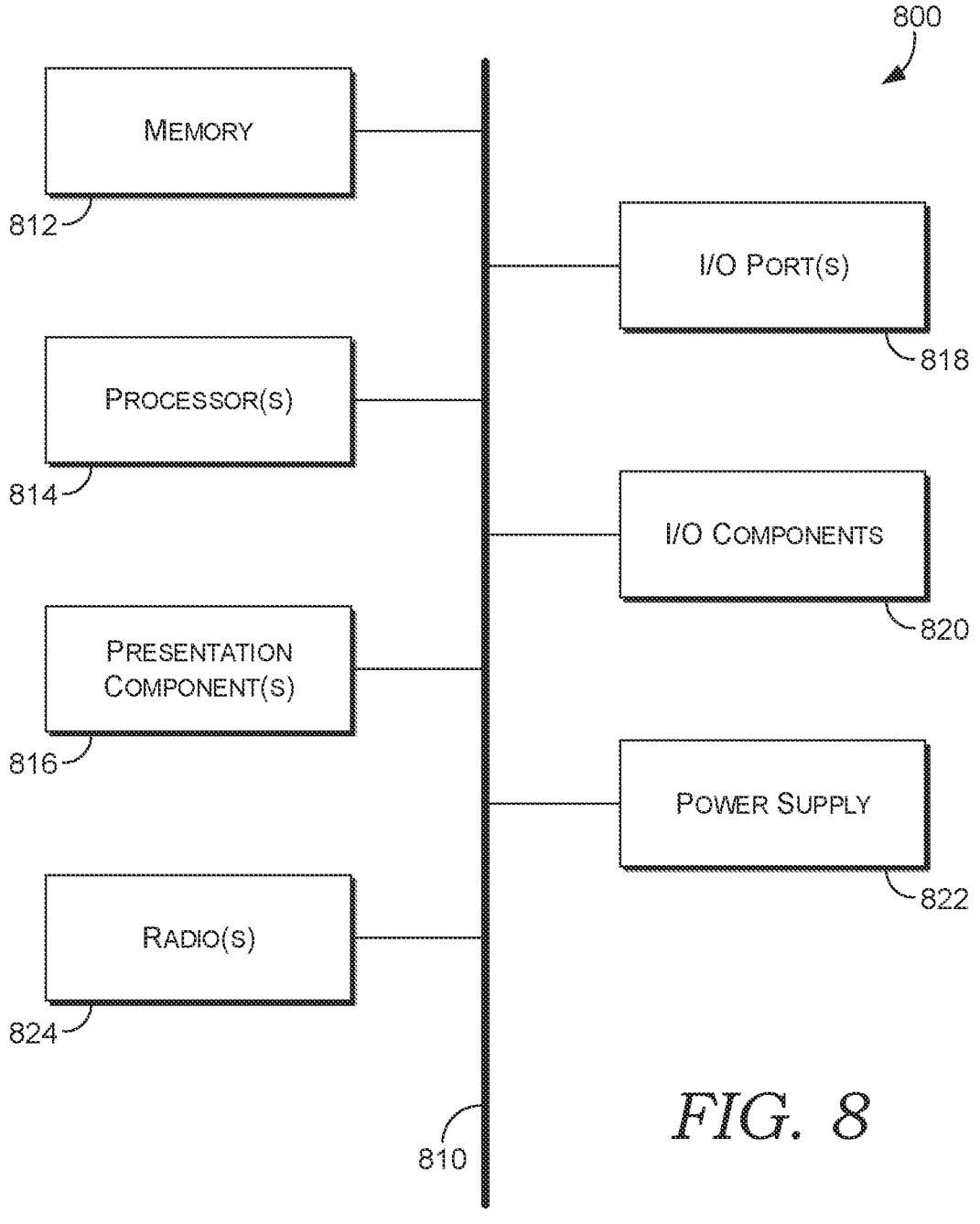
FIG. 8 is a block diagram of an example computing environment suitable for use in implementing an embodiment of the present disclosure.
Figure 9:
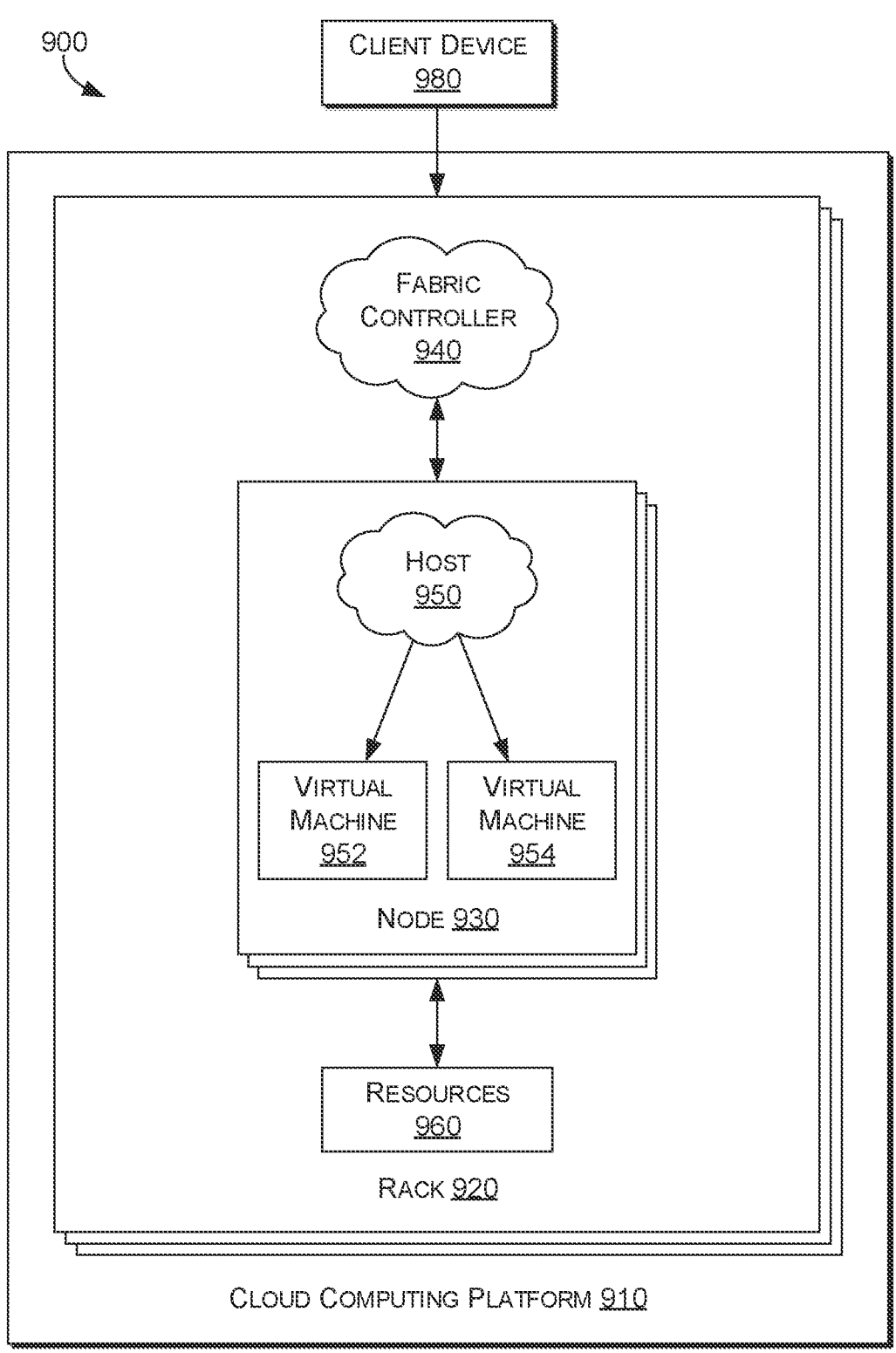
FIG. 9 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 8 and 9, respectively. With reference to FIG. 8, an example computing device is provided and referred to generally as computing device 800. The computing device 800 is but one example of a suitable computing environment and is not intended to suggest any limitation as to the scope of use or functionality of embodiments of the disclosure, and nor should the computing device 800 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. In one example, bus 810 represents one or more buses (such as an address bus, data bus, or combination thereof). Although the various blocks of FIG. 8 are shown with lines for the sake of clarity, in reality, these blocks represent logical, not necessarily actual, components. For example, a presentation component includes a display device, such as an I/O component. Also, processors have memory. This disclosure recognizes that such is the nature of the art and reiterate that the diagram of FIG. 8 is merely illustrative of an example computing device that can be used in connection with one or more embodiments of the present disclosure. Distinction is not made between such categories as "workstation," "server," "laptop," or "handheld device," as all are contemplated within the scope of FIG. 8 and with reference to "computing device."

Computing device 800 typically includes a variety of computer-readable media. Computer-readable media can be any available media that can be accessed by computing device 800 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 812 includes computer storage media in the form of volatile and/or non-volatile memory. In one example, the memory is removable, non-removable, or a combination thereof. Hardware devices include, for example, solid-state memory, hard drives, and optical-disc drives. Computing device 800 includes one or more processors 814 that read data from various entities such as memory 812 or I/O components 820. As used herein and in one example, the term processor or "a processer" refers to more than one computer processor.

For example, the term processor (or "a processor") refers to at least one processor, which is a physical or virtual processor, such as a computer processor on a virtual machine. In one example, the term processor (or "a processor") refers to a plurality of processors, each of which is physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 816 presents data indications to a user or other device. Presentation components include, for example, a display device, speaker, printing component, vibrating component, and the like.

The I/O ports 818 allow computing device 800 to be logically coupled to other devices, including I/O components 820, some of which are built-in. Illustrative components include a microphone, joystick, game pad, satellite dish, scanner, printer, or a wireless device. The I/O components 820 can provide a natural user interface (NUI) that processes air gestures, voice, or other physiological inputs generated by a user. In some instances, inputs are transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on the computing device 800. In one example, the computing device 800 is equipped with depth cameras, such as stereoscopic camera systems, infrared camera systems, red-green-blue (RGB) camera systems, and combinations of these, for gesture detection and recognition. Additionally, an example computing device 800 is equipped with accelerometers or gyroscopes that enable detection of motion. The output of the accelerometers or gyroscopes may be provided to the display of the computing device 800 to render immersive augmented reality or virtual reality.

Some embodiments of computing device 800 include one or more radio(s) 824 (or similar wireless communication components). The radio transmits and receives radio or wireless communications. Example computing device 800 is a wireless terminal adapted to receive communications and media over various wireless networks. Example computing device 800 communicates via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. When this disclosure refers to "short" and "long" types of connections, this disclosure does not mean to refer to the spatial relation between two devices. Instead, this disclosure is generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth connection to another computing device is a second example of a short-range connection, or a near-field communication connection. A long-range connection may include a connection using, by way of example and not limitation, one or more of Code-Division Multiple Access (CDMA), General Packet Radio Service (GPRS), Global System for Mobile Communication (GSM), Time-Division Multiple Access (TDMA), and 802.16 protocols.

Referring now to FIG. 9, an example distributed computing environment 900 is illustratively provided, in which implementations of the present disclosure can be employed. In particular, FIG. 9 shows a high-level architecture of an example cloud computing platform 910 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 900 that includes cloud computing platform 910, rack 920, and node 930 (for example, computing devices, processing units, or blades) in rack 920. The technical solution environment can be implemented with cloud computing platform 910, which runs cloud services across different data centers and geographic regions. Cloud computing platform 910 can implement the fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. In one example, the cloud computing platform 910 is a public cloud, a private cloud, or a dedicated cloud.

Node 930 can be provisioned with host 950 (for example, operating system or runtime environment) running a defined software stack on node 930. Node 930 can also be configured to perform specialized functionality (for example, computer nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multi-tenant infrastructure or tenancy. The terms "service application," "application," or "service" are used interchangeably with regards to FIG. 9, and broadly refer to any software, or portions of software, that run on top of, or access storage and computing device locations within, a datacenter.

When more than one separate service application is being supported by nodes 930, certain nodes 930 are partitioned into virtual machines (for example, virtual machine 952 and virtual machine 954). Physical machines can also concurrently run separate service applications. The virtual machines or physical machines can be configured as individualized computing environments that are supported by resources 960 (for example, hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 980 is linked to a service application in cloud computing platform 910. Example client device 980 is any type of computing device, such as user device 102 described with reference to FIG. 1, and the client device 980 can be configured to issue commands to cloud computing platform 910. In embodiments, client device 980 communicates with service applications through a virtual Internet Protocol (IP) and load balancer or other means that direct communication requests to designated endpoints in cloud computing platform 910. Certain components of cloud computing platform 910 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein and in one example, the term "set" or a "subset" is employed to refer to an ordered (i.e., sequential) or an unordered (i.e., non-sequential) collection of objects (or elements), such as machines (for example, computer devices), physical and/or logical addresses, graph nodes, graph edges, functionalities, and the like. In one example, a subset refers to a smaller portion of objects contained in a set. As used herein, a set or subset may include N elements, where N is any positive integer. That is, a set or subset may include 1, 2, 3, . . . . N objects and/or elements, where N is a positive integer with no upper bound. Therefore, as used herein, a set or subset does not include a null set (i.e., an empty set), that includes no elements (for example, N=0 for the null set). A set may include only a single element. In other embodiments, a set may include a number of elements that is significantly greater than one, two, three, or billions of elements. A set or subset may be an infinite set or a finite set. The objects included in some sets may be discrete objects (for example, the set of natural numbers N). The objects included in other sets may be continuous objects (for example, the set of real numbers R). In some embodiments, "a set of objects" or a "subset of objects" that are not null sets of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset" is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present disclosure are described with reference to a computing device or a distributed computing environment; however, the computing device and distributed computing environment depicted herein are non-limiting examples. Moreover, the terms "computer system" and "computing system" may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:
1. A system, comprising:
at least one computer processor; and
computer storage media storing computer-useable instructions that, when used by the at least one computer processor, cause the system to perform operations comprising:

accessing navigation data comprising indications of navigations on a network of a plurality of hosts, each navigation corresponding to a client navigating on the network from a referrer host to a referred host;

based on the navigation data, generating a Host Navigation Graph (HNG) comprising nodes and edges, each node corresponding to a respective host of the network, and each edge corresponding to at least one of the navigations;

from the HNG, determining a first cluster comprising at least a portion of the HNG indicating close-knit navigation activity occurring within the portion;

for a first node of the first cluster, determining, based on at least the first cluster, a host authority value for a first host corresponding to the first node; and providing an indication indicative of a reliability of the first host based on the host authority value.

2. The system of claim 1, wherein the host authority value for the first host is determined based on at least one feature comprising at least one of:

a first feature indicative of a cluster size of a largest cluster to which the first host belongs;

a second feature indicative of a mean size of clusters associated with the first host;

a third feature indicative of a cumulative size of the clusters associated with the first host;

a fourth feature indicative of a number of clusters in which the first host is contained;

a fifth feature indicative of a percentage of clusters, of the clusters in which the host is contained, that include low-authority hosts and in which the first host is contained, wherein the percentage of clusters is determined by dividing a total number of clusters in which the first host is contained by the number of clusters to which the first host is contained and that include the low-authority hosts;

a sixth feature indicative of a cardinality of the first host, wherein the cardinality of the first host comprises an indication of a presence of the first host in the HNG;

a seventh feature indicative of a view count of the first host, wherein the view count comprises an aggregate number of views garnered by the host over a period of time;

an eighth feature indicative of a frequency with which the first host and a second host coexist in the HNG; or a ninth feature indicative of a regularity with which the first host and the second host share a similar cluster.

3. The system of claim 2, wherein the host authority value is determined using a classifier or artificial intelligence (AI) model that is trained on the at least one feature as related to the plurality of hosts.

4. The system of claim 2, wherein the first cluster corresponds to a clique, wherein the at least one feature is determined by performing a Bron-Kerbosch Clique Graph Mining algorithm.

5. The system of claim 1, wherein each edge of the HNG comprises at least three navigations.

6. The system of claim 1, wherein the first cluster comprises at least one clique comprising a subset of vertices formed by at least two nodes connected by at least one edge in the HNG, wherein the HNG is undirected.

7. The system of claim 1, wherein the first cluster has at least three nodes and at least one node of the at least three nodes corresponds to a host that has been predetermined to be of a low authority based on a data record for the at least one node.

8. The system of claim 1, wherein determining the first cluster comprises:

accessing, from the HNG, a plurality of nodes;

identifying, from the plurality of nodes, a set of nodes having at least a threshold number of navigations; and determining from the set of nodes, a subset of nodes sharing the close-knit navigation activity with the first host.

9. The system of claim 8, wherein the threshold number of navigations comprises at least three navigations.

10. The system of claim 1, wherein the operations further comprise determining the close-knit navigation activity by:

receiving a user interaction with a component associated with the first host;

accessing, from the navigation data, prior navigations within a threshold value of time that form a sequence of navigations to the first host; and determining at least one feature for each prior navigation of the sequence of navigations, wherein the host authority value for the first host is determined based on the at least one feature.

11. A system comprising:

at least one computer processor; and computer storage media storing computer-useable instructions that, when used by the at least one computer processor, cause the system to perform operations comprising:

accessing crowdsourced navigation data from a plurality of users, the navigation data comprising indications of navigations on a network of a plurality of hosts, each navigation corresponding to a client navigating on the network from a referrer host to a referred host;

based on the navigation data, generating a Host Navigation Graph (HNG) comprising nodes and edges, each node corresponding to a respective host of the network, and each edge corresponding to at least one of the navigations;

from the HNG, determining a first cluster comprising at least a portion of the HNG indicating close-knit navigation activity occurring within the portion;

for a first node of the first cluster, determining, based on at least the first cluster, a host authority value for a first host corresponding to the first node; and causing a browser to perform a mitigation action based on the host authority value indicating that the first host corresponds to a low-authority host.

12. The system of claim 11, wherein the mitigation action comprises at least one of:

generating a graphical user interface (GUI) element identifying the first host as the low-authority host;

restricting access to the first host; or reordering search results so that hosts having a higher authority are ordered ahead of the first host.

13. The system of claim 12, wherein the GUI element comprises at least one of:

a binary indication indicating whether or not a corresponding Uniform Resource Locator (URL) of a list of search results is reliable or not reliable;

a pop-up window indicating that the corresponding URL is reliable or not reliable; or a value indicative of a corresponding host authority level of a URL in proximity to the value.

14. The system of claim 11, wherein the host authority value is determined using a classifier or AI model that is trained on at least one feature as related to the plurality of hosts.

15. The system of claim 11, wherein the first cluster has at least three nodes and at least one node of the at least three nodes corresponds to a host that has been predetermined to be of a low authority based on a data record for the at least one node.

16. The system of claim 11, wherein accessing the crowd-sourced navigation data comprises accessing navigation activity data from user accounts that have opted in to a data sharing policy.

17. The system of claim 11, wherein the host authority value for the first host is determined based on at least one feature comprising at least one of:

a first feature indicative of a cluster size of a largest cluster to which the first host belongs;

a second feature indicative of a percentage of clusters, of the clusters in which the first host is contained, that include low-authority hosts, wherein the percentage of clusters is determined by dividing a total number of clusters in which the first host is contained by a number of clusters to which the first host is contained and that include the low-authority hosts; or a third feature indicative of a regularity with which the first host and a second host share a similar cluster.

18. A computer-implemented method comprising:

accessing navigation data comprising indications of navigations on a network of a plurality of hosts, each navigation corresponding to a client navigating on the network from a referrer host to a referred host;

based on the navigation data, generating a Host Navigation Graph (HNG) comprising nodes and edges, each node corresponding to a respective host of the network, and each edge corresponding to at least one of the navigations;

from the HNG, determining a first cluster comprising at least a portion of the HNG indicating close-knit navigation activity occurring within the portion;

for a first node of the first cluster, determining, based on at least the first cluster, a host authority value for a first host corresponding to the first node; and providing an indication indicative of a reliability of the first host based on the host authority value.

19. The method of claim 18, wherein the host authority value is determined using a classifier or AI model that is trained on at least one feature as related to the plurality of hosts.

20. The method of claim 18, wherein the first cluster has at least three nodes and at least one node of the at least three nodes corresponds to a host that has been predetermined to be of a low authority based on a data record for the at least one node.

* * * * *